US012762783B2

(12) United States Patent
Moreton et al.

(10) Patent No.: US 12,762,783 B2
(45) Date of Patent: Oct. 13, 2026

(54) MICRO-MESHES, A STRUCTURED GEOMETRY FOR COMPUTER GRAPHICS

(71) Applicant: NVIDIA Corporation, Santa Clara, CA (US)

(72) Inventors: Henry Packard Moreton, Woodside, CA (US); Yury Uralsky, Los Gatos, CA (US); John Burgess, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 896 days.

(21) Appl. No.: 17/946,235

(22) Filed: Sep. 16, 2022

(65) Prior Publication Data

US 2023/0108967 A1 Apr. 6, 2023

Related U.S. Application Data

(60) Provisional application No. 63/245,155, filed on Sep. 16, 2021.

(51) Int. Cl.

| | |
|---|---|
| ***G06T 15/06*** | (2011.01) |
| ***G06T 1/60*** | (2006.01) |
| ***G06T 9/00*** | (2006.01) |
| ***G06T 15/00*** | (2011.01) |
| ***G06T 15/40*** | (2011.01) |

(Continued)

(52) U.S. Cl.

CPC ................ *G06T 15/06* (2013.01); *G06T 1/60* (2013.01); *G06T 9/001* (2013.01); *G06T 15/005* (2013.01); *G06T 15/40* (2013.01); *G06T 15/50* (2013.01); *G06T 17/10* (2013.01); *G06T 17/20* (2013.01); *G06T 17/205* (2013.01); *G06T 19/20* (2013.01); *G06T 2210/08* (2013.01);

(Continued)

(58) Field of Classification Search

CPC G06T 15/06; G06T 1/60; G06T 9/001; G06T 15/005; G06T 15/40; G06T 15/50; G06T 17/10; G06T 17/20; G06T 17/205; G06T 19/20; G06T 2210/08; G06T 2210/12; G06T 2210/21; G06T 2210/36; G06T 2219/2016

See application file for complete search history.

(56) References Cited

U.S. PATENT DOCUMENTS

| | | | | |
|---|---|---|---|---|
| 6,184,897 B1 * | 2/2001 | Gueziec | ................. | G06T 17/20 345/440 |
| 7,324,105 B1 * | 1/2008 | Moreton | ................. | G06T 17/20 345/423 |

(Continued)

OTHER PUBLICATIONS

U.S. Appl. No. 17/946,221, filed Mar. 2023, Muthler.
U.S. Appl. No. 17/946,515, filed Sep. 2022, Burgess.
U.S. Appl. No. 17/946,563, filed Sep. 2022, Salvi.

*Primary Examiner* — Abderrahim Merouan
(74) *Attorney, Agent, or Firm* — Nixon & Vanderhye, P.C.

(57) ABSTRACT

A μ-mesh ("micromesh"), which is a structured representation of geometry that exploits coherence for compactness and exploits its structure for efficient rendering with intrinsic level of detail is provided. The micromesh is a regular mesh having a power-of-two number of segments along its perimeters, and which can be overlaid on a surface of a geometric primitive. The micromesh is used for providing a visibility map and/or a displacement map that is accessible using barycentric coordinates of a point of interest on the micromesh.

18 Claims, 38 Drawing Sheets

(51) Int. Cl.

| | |
|---|---|
| ***G06T 15/50*** | (2011.01) |
| ***G06T 17/10*** | (2006.01) |
| ***G06T 17/20*** | (2006.01) |
| ***G06T 19/20*** | (2011.01) |

(52) U.S. Cl.

CPC ...... *G06T 2210/12* (2013.01); *G06T 2210/21* (2013.01); *G06T 2210/36* (2013.01); *G06T 2219/2016* (2013.01)

(56) References Cited

U.S. PATENT DOCUMENTS

| | | | | |
|---|---|---|---|---|
| 7,734,387 | B1 * | 6/2010 | Young | G05D 1/0214 701/533 |
| 2005/0057569 | A1 * | 3/2005 | Berger | G06T 13/40 704/E21.02 |
| 2007/0291233 | A1 * | 12/2007 | Culbertson | H04N 9/3194 353/34 |
| 2011/0085736 | A1 * | 4/2011 | Dmitriev | G06T 17/20 382/199 |
| 2014/0277691 | A1 * | 9/2014 | Jacobus | B66F 9/24 700/216 |
| 2017/0358133 | A1 * | 12/2017 | Iverson | G06T 17/205 |
| 2018/0068178 | A1 * | 3/2018 | Theobalt | G06T 13/40 |
| 2018/0096516 | A1 * | 4/2018 | Luebke | G06T 15/06 |
| 2020/0020155 | A1 * | 1/2020 | Duka | G06T 7/596 |
| 2020/0051316 | A1 * | 2/2020 | Laine | G06T 15/06 |
| 2020/0334874 | A1 * | 10/2020 | Phogat | G06T 11/001 |
| 2021/0158585 | A1 * | 5/2021 | Chalfin | G06T 7/60 |
| 2021/0343082 | A1 * | 11/2021 | Kim | G06T 9/001 |
| 2021/0390759 | A1 * | 12/2021 | Muthler | G06T 17/10 |
| 2022/0051467 | A1 * | 2/2022 | Woop | G06T 1/60 |
| 2023/0017659 | A1 * | 1/2023 | Thonat | G06T 15/06 |
| 2023/0084570 | A1 * | 3/2023 | Muthler | G06T 9/001 345/426 |
| 2023/0108967 | A1 * | 4/2023 | Moreton | G06T 15/06 345/423 |
| 2024/0394955 | A1 * | 11/2024 | Rangel Kuoppa | G16H 30/20 |

* cited by examiner

| order | segments per side | total µ-vertices | total µ-triangles | 10-bit | 11-bit | 12-bit |
|---|---|---|---|---|---|---|
| | | | | | size in bytes | |
| 0 | 1 | 3 | 1 | 4 | 4 | 5 |
| 1 | 2 | 6 | 4 | 8 | 8 | 9 |
| 2 | 4 | 15 | 16 | 19 | 21 | 23 |
| 3 | 8 | 45 | 64 | 56 | 62 | 68 |
| 4 | 16 | 153 | 256 | 191 | 210 | 230 |
| 5 | 32 | 561 | 1024 | 701 | 771 | 842 |
| 6 | 64 | 2145 | 4096 | 2681 | 2949 | 3218 |
| 7 | 128 | 8385 | 16384 | 10481 | 11529 | 12578 |
| 8 | 256 | 33153 | 65536 | 41441 | 45585 | 49730 |
| 9 | 512 | 131841 | 262144 | 164801 | 181281 | 197762 |
| 10 | 1024 | 525825 | 1048576 | 657281 | 723009 | 788738 |
| 11 | 2048 | 2100225 | 4194304 | 2625281 | 2887809 | 3150338 |
| 12 | 4096 | 8394753 | 16777216 | 10493441 | 11542785 | 12592130 |
| 13 | 8192 | 33566721 | 67108864 | 41958401 | 46154241 | 50350082 |

FIG. 16

```
// enter a triangle at "W" and exit at "V"
Subdivide(vertex u, vertex v, vertex w, bool hand, int k) {
      if (k) {
            k=k-1;
            vertex uv = average(u,v);
            vertex vw = average(v,w);
            vertex wu = average(w,u);
            // since we enter at W
            // consistent order, exits at vw
            /*0*/ Subdivide(wu, vw, w, hand, k);

            // enter at vw  visit middle since we exit at v
            /*1*/ Subdivide(uv, wu, vw, !hand, k);

            // U remains, exit at uv to get to v, enter wu
            /*2*/ Subdivide(u, wu, uv, hand, k);

            // since we exit a V
            /*3*/ Subdivide(vw, v, uv, !hand, k); // enter at uv, exit at v
      }
}
```

FIG. 29

```
prediction = (v0 + v1 + 1) / 2
fullCorrection = signextend(correction) << shift[level][type]
decoded = prediction + fullCorrection
```

FIG. 30

1) *(Early check for the zero-bit case)* If b is equal to 0, return 0.
2) *(Range of representable values around 0 with shift applied is −nR … pR-1)* Set $nR = 2^{b-1+s}$, $pR = nR - 2^{s}$.
3) *(Difference in Z)* Set signed integer $d = r - p$.
4) *(Is the reference value between the two extreme corrections?)* If $(d \bmod 2048) > pR$ and $2048 - (d \bmod 2048) > nR$
    a. *(Set iLo and iHi to extreme correction values)* Set $iLo = -2^{(b-1)}$, $iHi = 2^{(b-1)} - 1$.
    b. Proceed to Step 6.
5) Otherwise: *(The reference value is between two representable values; find them in $\mathbb{Z}/2^{11}\mathbb{Z}$; then the ideal correction must be one of the two.)*
    a. Set uD to $d - 2048$ if $d > pR$, $d + 2048$ if $d < -nR$, and $d$ otherwise.
    b. Set iLo to floor $\left(\frac{uD}{2^{s}}\right)$, using floating-point arithmetic for the division.
    c. Set iHi to $iLo + 1$
6) *(Compute error for iLo)* Set eLo to the absolute difference of *r*, and the result of substituting correction $= iLo$ into Formula 1.
7) *(Compute error for iHi)* Set eHi to the absolute difference of *r*, and the result of substituting correction $= iHi$ into Formula 1.
8) *(Choose the option with lower error)* If $eLo \leq eHi$, return iLo. Otherwise, return iHi.

FIG. 33

MICRO-MESHES, A STRUCTURED GEOMETRY FOR COMPUTER GRAPHICS

CROSS-REFERENCE TO RELATED APPLICATIONS

This application claims priority to U.S. Provisional Patent Application No. 63/245,155 filed Sep. 16, 2021, the entire content of which is herein incorporated by reference. Additionally, the entire contents of each of the concurrently filed U.S. application Ser. No. 17/946,221 "Accelerating Triangle Visibility Tests for Real-Time Ray Tracing", U.S. application Ser. No. 17/946,515 "Displaced Micro-meshes for Ray and Path Tracing", and U.S. application Ser. No. 17/946,563 "Displaced MicroMesh Compression" are herein incorporated by reference.

FIELD

The present technology relates to computer graphics, and more particularly to efficiently storing and accessing scene information for rendering.

BACKGROUND

The designers of computer graphics systems continue to desire the ability to greatly increase the geometric level of detail in scenes that are rendered. In currently available rendering systems, scenes are composed of millions of triangles. To increase the level of detail substantially, for example, to billions of triangles, the storage cost and processing time involved would need to be increased by a corresponding factor.

Ray tracing is a well-known rendering technique known for its realism and for its logarithmic scaling with very large, complex scenes. Ray tracing, however, suffers from a linear cost of creating the necessary data structures (e.g., bounding volume hierarchies (BVH)), and the storage of the additional geometry. Rasterization requires linear processing time as well as linear storage requirements. Some other systems, such as Unreal Engine's Nanite™, support high levels of geometric detail in a modest memory footprint and may also create multiple levels of detail as part of their scene description. However, these systems require large preprocessing-time steps and produce rigid models, incapable of supporting animation or online content creation. Nanite's representation is not well suited to ray tracing as it requires costly (time and space) ancillary BVH data structures in addition to requiring decompression of its specialized representation.

Therefore, further improved techniques for storing and rendering highly detailed scenes are desired.

BRIEF DESCRIPTION OF THE DRAWINGS

FIG. 1A illustrates a triangle μ-mesh and FIG. 1B illustrates a quadrilateral μ-mesh.

FIG. 4A shows example displacement mapped u-triangles. FIG. 4B shows example visibility masked μ-triangles. FIG. 4C shows μ-mesh defined by combined displaced map and visibility mask.

FIG. 9C shows a scenario with no reduction. FIG. 9B shows a scenario with bottom decimation. FIG. 9A shows a scenario with bottom and side decimation.

FIG. 16 illustrates a table showing μ-mesh statistics vs. resolution and DM memory size vs. displacement bit-depth, according to some embodiments.

FIG. 29 illustrates pseudocode for the recursive traversal shown in FIG. 28, according to some embodiments.

FIG. 30 illustrates pseudo code for prediction and correction of vertices in level n from vertices in level n−1 in a hierarchy, in which each decoded value becomes a source of prediction for the next level down, according to some embodiments. The formula shown in FIG. 30 is referred to as "Formula 1".

FIG. 33 shows pseudocode for a technique to, given a prediction (p), reference (r), shift (s), and a bit width (b), determine the best correction (c) within a finite number of operations, in accordance with some embodiments.

DETAILED DESCRIPTION OF NON-LIMITING EMBODIMENTS

Very high quality, high-definition content is often very coherent, or locally similar. To achieve dramatically increased geometric quality, example embodiments provide the μ-mesh (also "micromesh"), which is a structured representation of geometry that exploits coherence for compactness (compression) and exploits its structure for efficient rendering with intrinsic level of detail (LOD) and animation. The μ-mesh structure can be used in ray tracing to avoid large increases in bounding volume hierarchy (BVH) construction costs (time and space) while preserving high efficiency ray tracing. The micro-mesh's structure defines an intrinsic bounding structure that can be directly used for ray tracing, avoiding the creation of redundant bounding data structures. When rasterizing, the intrinsic μ-mesh LOD can be used to rasterize right-sized primitives.

Figure 1A:
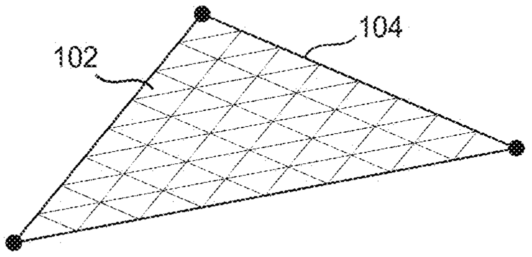
FIGS. 1A and 1B illustrate examples of μ-meshes according to some embodiments.
Figure 1B:
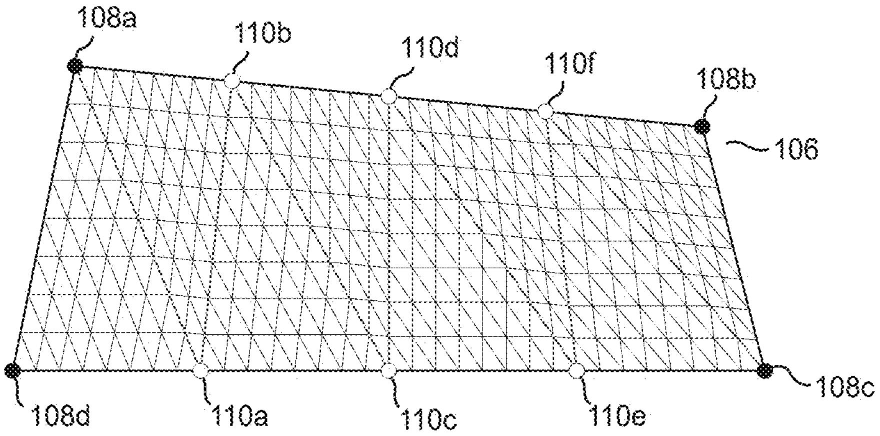
Figure 2:
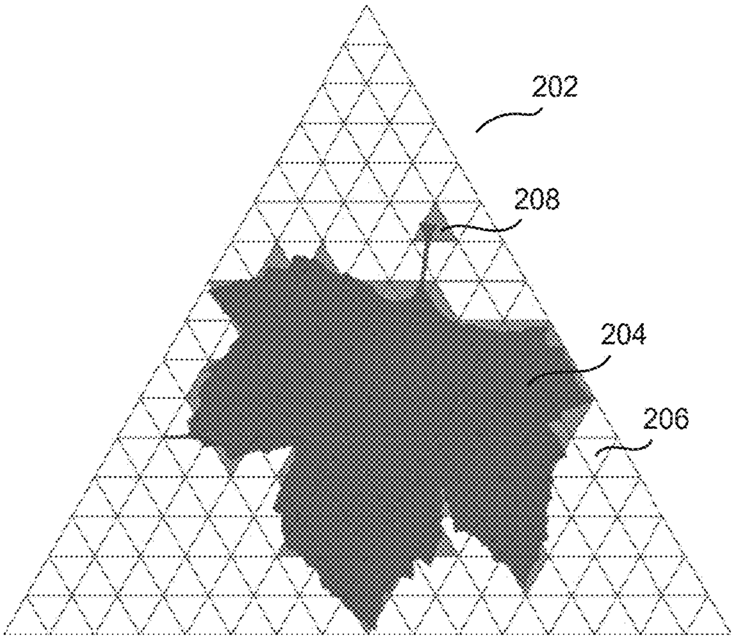
FIG. 2 illustrates a visibility mask (VM) applied to a μ-mesh, in accordance with an embodiment.

A μ-mesh is a regular mesh having a power-of-two number of polygonal regions along its perimeters. The description herein focuses on the representation of a μ-mesh as a mesh with a power-of-two number of μ-triangles (also "microtriangles"). In some example embodiments, a μ-mesh may be a triangle or quadrilateral composed of a regular grid of μ-triangles, with the grid dimensions being powers of two (1, 2, 4, 8, etc.). FIGS. 1A and 1B illustrate two schematic examples of μ-meshes according to some embodiments. FIG. 1A shows a triangular μ-mesh 104 made up as a grid of 0-triangles 102. The quadrilateral mesh 106 in FIG. 1B is geometrically an array of triangular μ-meshes where the vertices indicated with empty circles ("○") 110*a*-110*f* are implicit and are derived from the vertices indicated as filled circles ("•") 108*a*-108*d*.

μ-meshes are defined with vertex positions specified at their corners, paired with optional displacement vectors that are used in conjunction with displacement maps (DM). A visibility mask (VM) may also optionally be associated with a μ-mesh. When interpreted, in some embodiments, the VMs classify each associated μ-triangle as either opaque, unknown, or transparent. FIG. 2 shows a maple leaf of which the outline is approximated by a VM 202. In the illustrated embodiment, μ-triangles that are fully covered by the maple leaf are opaque (e.g., 204), μ-triangles that have no part covered by the maple leaf are transparent (e.g., 206), and μ-triangles of which a part is covered by the maple leaf are unknown (neither opaque nor transparent) (e.g., 208). In some other embodiments, the VM may classify respective μ-triangles according to a different classification of visibility states.

In an example embodiment in which μ-meshes and VMs are used in ray tracing, the area 202 may correspond to the geometric primitive that is tested in a ray-triangle intersection. The implementation would then, based on the μ-mesh overlaid on the area 202, identify the μ-triangle in which the intersection point (hit point) occurs. The identified μ-triangle may then be used to compute an index to obtain scene details of the area 202 at the intersection point. For example, the scene details may pertain to characteristics, at the identified μ-triangle, of the mask corresponding to the maple leaf as shown in FIG. 2. Accessing the index requires only the intrinsic parameterization of the μ-mesh that overlays the geometric primitive 202, and does not require additional data describing the mapping between the subject triangle (e.g., geometric primitive 202) and points within the subject triangle to be stored. In example embodiments, all the information that is necessary to compute the index in example embodiments is (1) where the point, or equivalently the small region (e.g., μ-triangle), is located in the μ-mesh and (2) how big the small region is. This contrasts with texture mapping and the like that require texture coordinates that consume substantial storage and bandwidth. Phrased in another manner, in contrast to approaches that require texture coordinates and the like, in example embodiments, the barycentric coordinates of the hit points are used directly to access the mask, thereby avoiding the additional costs in storage, bandwidth and memory latency associated with additional coordinates and providing for faster access to scene information.

Figure 3B:
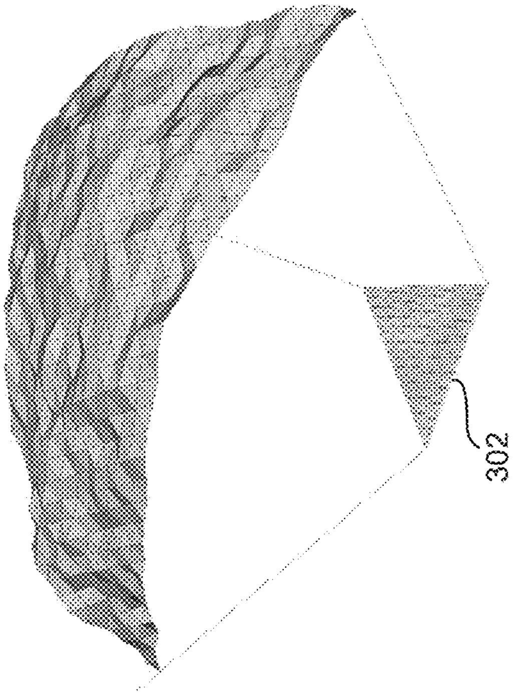
FIG. 3A and FIG. 3B illustrate a displacement map (DM) and an associated displaced μ-mesh, in accordance with an embodiment.
Figure 3A:

A DM contains a scalar displacement per μ-mesh vertex which is used to offset or displace the vertices of the μ-triangles of the μ-mesh. The μ-mesh vertex (sometimes referred to as "μ-vertex" for short) positions and displacement vectors are linearly interpolated across the face of the mesh, and then the μ-vertex is displaced using the interpolated position, displacement vector and the scalar displacement looked up in the DM. FIGS. 3A and 3B schematically illustrate a displacement map and an associated displaced μ-mesh, respectively, in relation to a base triangle 302.

Figure 4A:
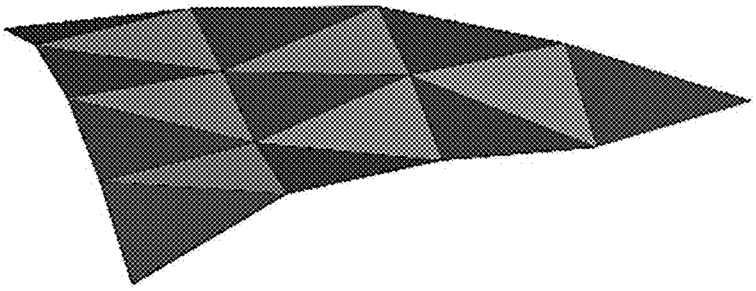
FIGS. 4A, 4B, and 4C illustrate an example application of a displacement map and a visibility mask on u-triangles, according to an example embodiment.
Figure 4B:
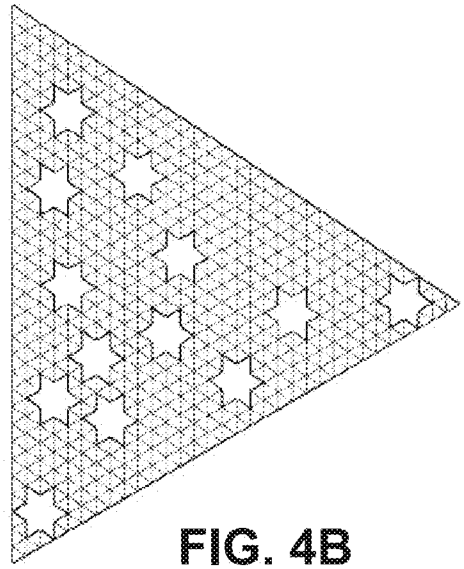
Figure 4C:
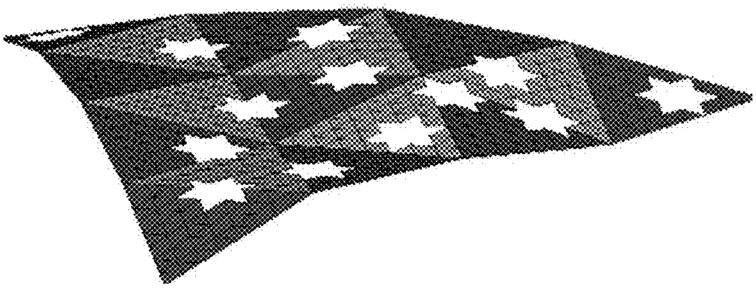

A VM and a DM associated with a same area of a scene may be stored at different resolutions that can be independent of one another. The independent resolution of VMs and DMs determine the resolution of their associated μ-meshes. As a result, μ-meshes may have two nesting resolutions when both a DM and a VM are specified. Two μ-meshes that have the same vertices (e.g., such as when they pertain to the same geometric primitive 202) nest in the sense that the μ-triangles of a lower order μ-mesh (e.g., a triangle μ-mesh having an order of two or $2^2$ μ-triangles per side) can be divided to form μ-triangles of a higher order μ-mesh (e.g., a triangle μ-mesh having an order of four or $2^4$ μ-triangles per side) since the two μ-meshes are powers of two in dimension. It is common for the resolution of the VM to be higher than the DM. In this case the DM displaces the μ-triangles at a coarser resolution and then the VM controls the visibility of μ-triangles within the displaced μ-triangles. FIGS. 4A, 4B and 4C schematically illustrates displacement mapped μ-triangles, visibility masked μ-triangles, and a μ-mesh defined by combined DM and VM, respectively. That is, the μ-mesh shown in FIG. 4C has both the displacement map shown in FIG. 4A and the visibility mask shown in FIG. 4B applied.

Meshes of μ-Meshes, Watertightness, and Resolution Propagation

Figure 5:
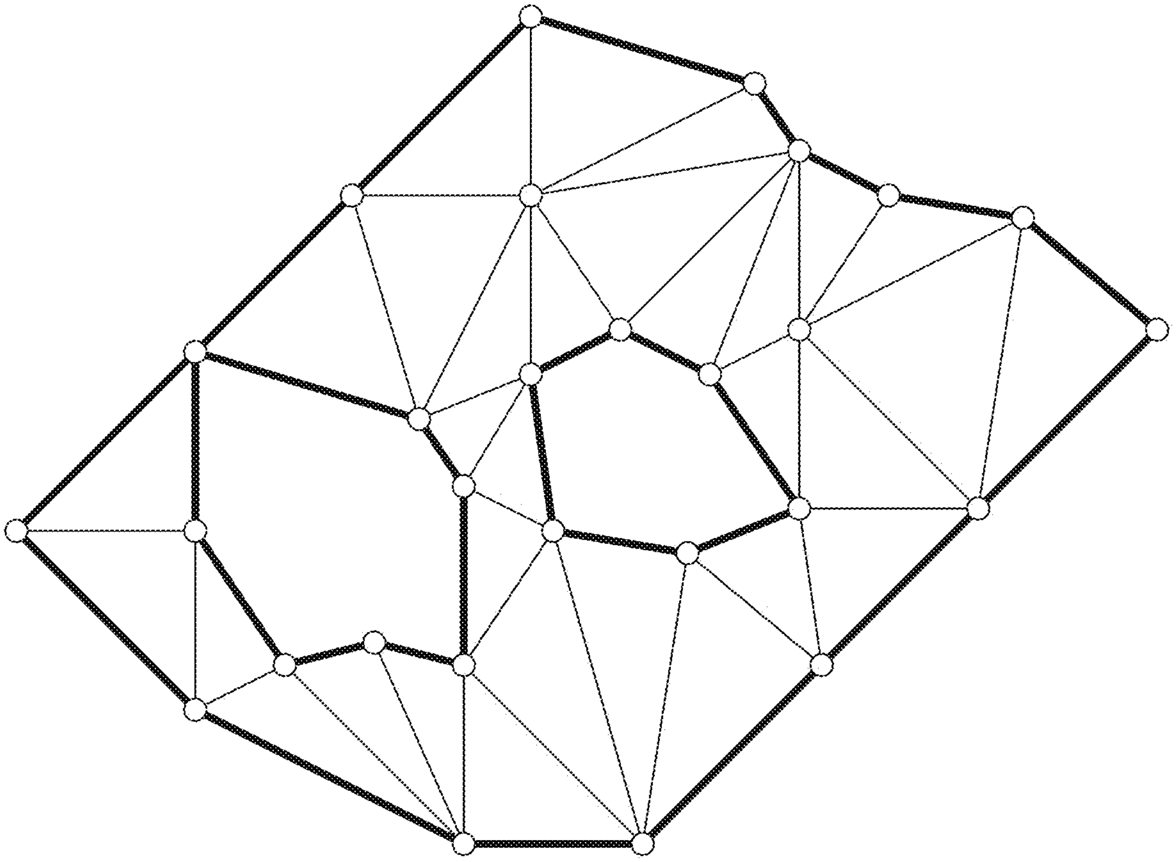
FIG. 5 shows an example μ-mesh with mesh vertices, edges, and faces with open edges along the perimeter and holes, according to an embodiment.

Complex objects can be represented by groups of μ-meshes. To represent an object or scene accurately, it is important that the description of that object or scene be consistent. One may start by examining meshes of triangles. A triangular mesh is composed of vertices, edges, and faces, which are triangles. Each edge of a mesh has exactly two incident triangles unless it is on the perimeter of an open mesh or on the edge of a hole in the interior of the mesh. Each edge that is on the perimeter of an open mesh or on the edge of a hole in the interior of the mesh has only one incident triangle, and is referred to here as a half-edge. FIG. 5 shows half-edges in thick outline.

Figure 6A:
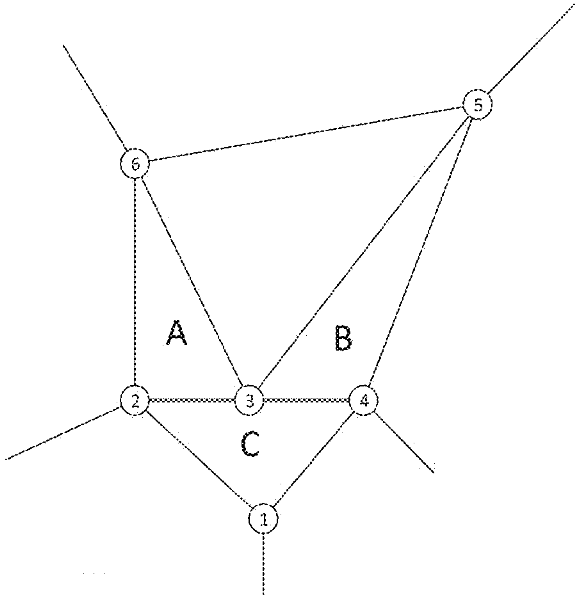
FIGS. 6A and 6B show a T-junction and the corresponding hole that can occur in a μ-mesh, respectively, according to an embodiment.
Figure 6B:
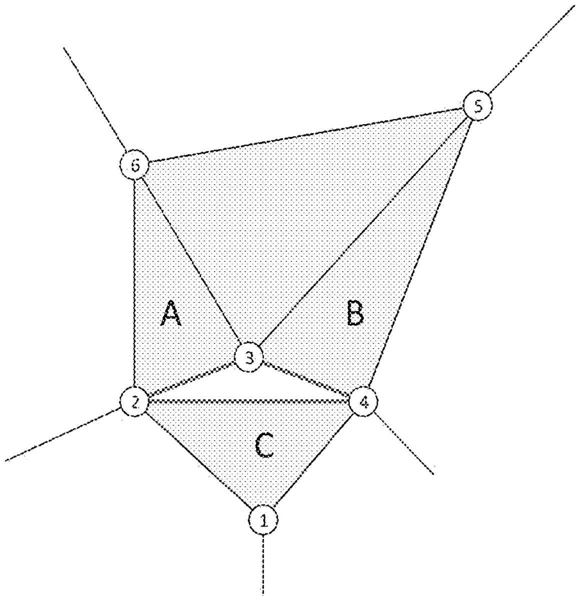

Vertices only occur at the end points of edges. As a result, the configuration shown in FIG. 6A represents a mesh with a hole (a crack, e.g., shown in FIG. 6B) and is referred to as a "T-junction". Vertex ③ appears to be "on" edge ②④, but edge ②③ has only one incident triangle (i.e., triangle A). There is no triangle ②③④ that is defined, and this introduces inconsistency in the μ-mesh. A consistent mesh is a prerequisite for consistent rendering. This consistency is often referred to as watertightness. A watertight sampling (rendering) of a mesh is free of gaps, pixel dropouts, or double hits.

Like a mesh of μ-triangles, a mesh of μ-meshes must also be watertight in order to provide for consistent rendering. Vertices and optional displacement direction at those vertices on shared edges must be consistent, exactly equal where logically the same. A mesh of vertices where all vertices on shared edges are consistent and exactly equal may be referred to as the "base mesh" for the mesh of μ-meshes. For watertightness of VM μ-triangles, a consistent base mesh is sufficient. VM μ-triangles are defined in barycentric space, and their watertightness depends solely on consistent mesh vertices. However, when using DMs, the mesh of DM μ-triangles must also be consistent. For example, if the mesh of μ-meshes is replaced with their corresponding DM μ-triangles, then the μ-triangles must be consistent.

Figure 7B:
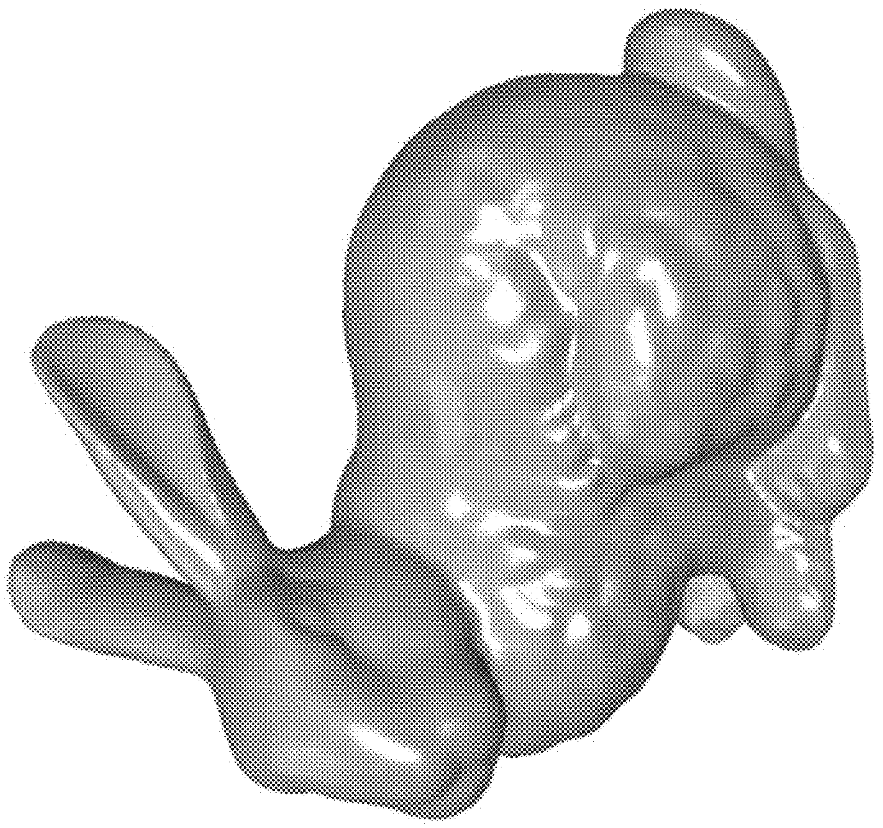
FIGS. 7A and 7B show the Stanford Bunny with uniform μ-mesh resolution applied according to an embodiment.
Figure 7A:
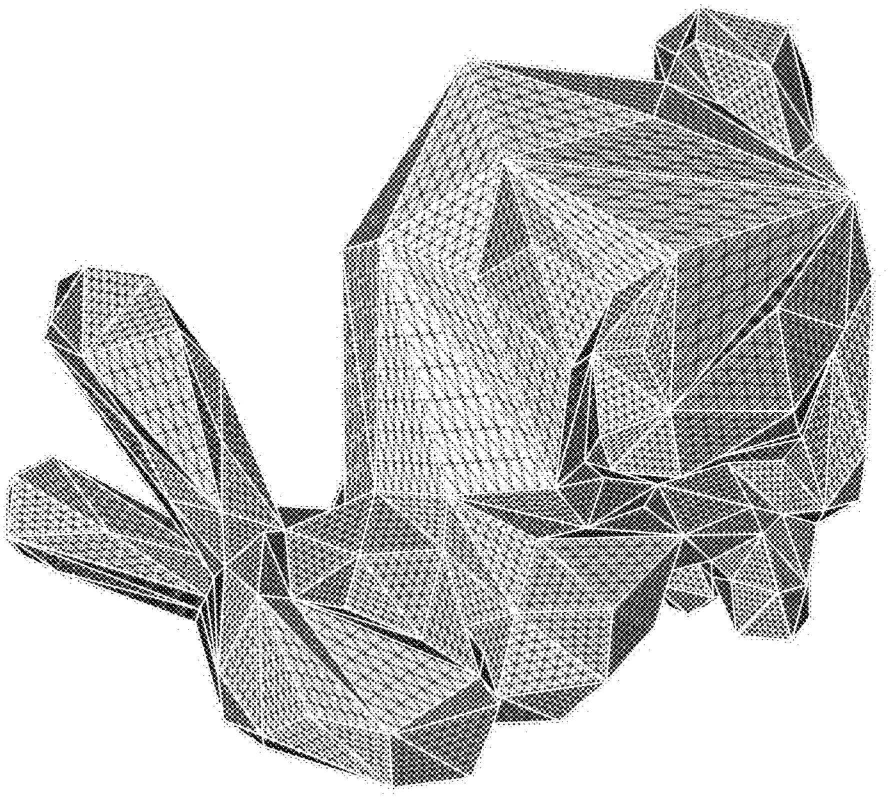

FIGS. 7A-7B show a mesh of μ-meshes capturing the Stanford Bunny, along with a rendering of the displacement mapped surface. Note that the resolution of all the faces of the mesh of μ-meshes in FIG. 7A is the same, with each μ-mesh having eight segments (e.g., eight μ-triangles) along its edges. This consistency of resolution is required to ensure watertightness. If the resolution of μ-meshes is varied from mesh to mesh, T-junctions (cracks such as that shown in FIG. 6B) may be introduced. A consequence of this requirement to have the same resolution over all the μ-meshes in the mesh of μ-meshes used to represent an object or scene is that smaller area μ-meshes (for example) may end up having a non-optimal number of (too many) μ-triangles for that smaller spatial area, and/or larger area μ-mesh faces may end up with too low a resolution (e.g., too few μ-triangles for that larger spatial area).

To mitigate the effects of this onerous requirement, a reduced edge-resolution flag is introduced. In addition to specifying the resolution of a μ-mesh, a flag for each edge of the primitive is specified to control whether it is downsampled (decimated) by a factor of two. The reduced edge-resolution flag indicates whether the adjacent face is at the same resolution or a factor of two lower. By associating the edge resolution flag with the higher resolution of two neighbors, no additional data needs to be stored. By not requiring a completely general specification of edge resolution, complex and costly stitching algorithms, and also the handling of non-barycentric aligned μ-triangles are avoided.

Figure 8B:
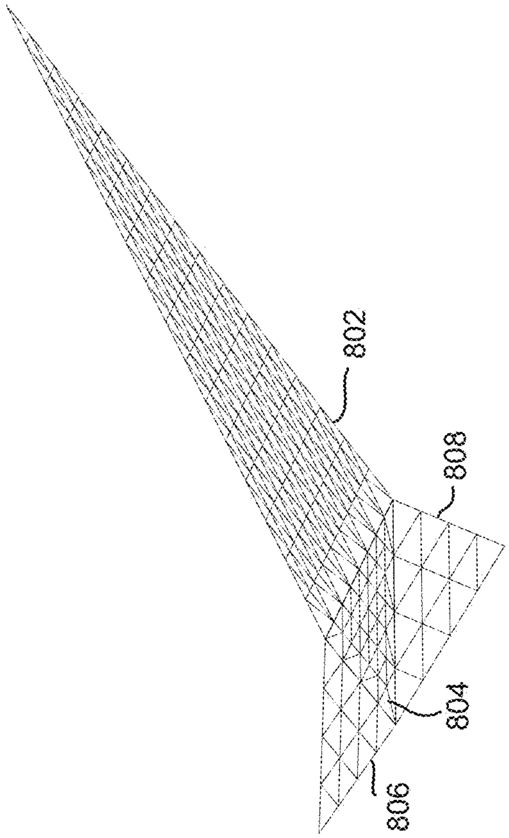
FIGS. 8A and 8B illustrate edge decimation controls and the mitigation of resolution propagation, according to some embodiments.
Figure 8A:
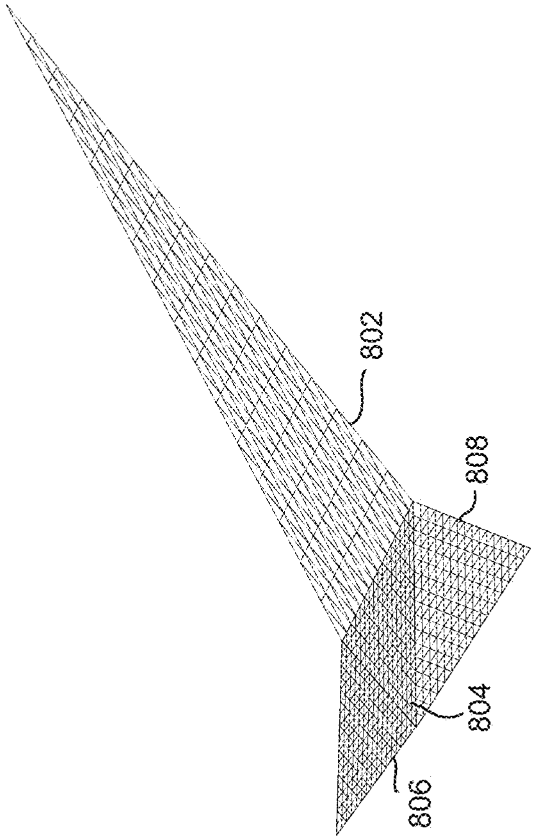

FIGS. 8A-8B illustrate the behavior of the edge decimation controls. FIG. 8A illustrates that the high resolution of the large thin triangle 802 (a first primitive or first μ-mesh) propagates into the neighboring smaller triangles (second primitives or second μ-meshes) 804-808, causing them to be sampled too densely, or over-sampled. FIG. 8B shows the effect of reducing the resolution of the edge shared between the large and smaller adjacent triangles. The center small triangle's 804 resolution is promoted to match the reduced resolution of its higher resolution neighbor 802, but the increase in resolution is isolated because the other two edges of the central triangle 804 can be decimated to match the desired resolution of its two neighbors 806 and 808.

Crack Suppression Alternatives

Figure 9C:
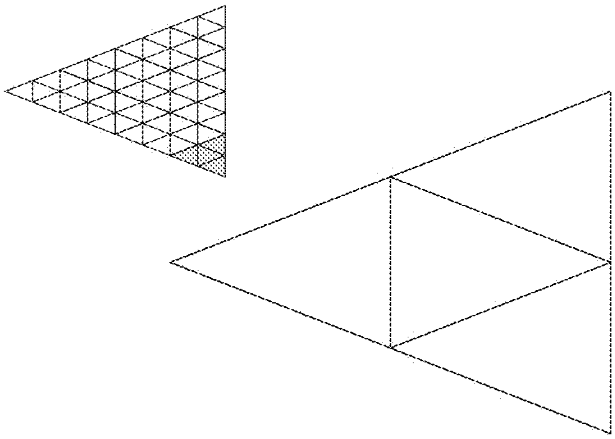
FIGS. 9A-9C illustrate reduced resolution control, according to some embodiments.
Figure 9B:
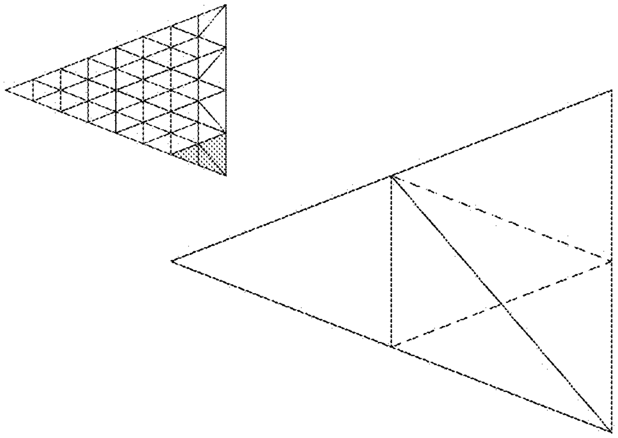
Figure 9A:
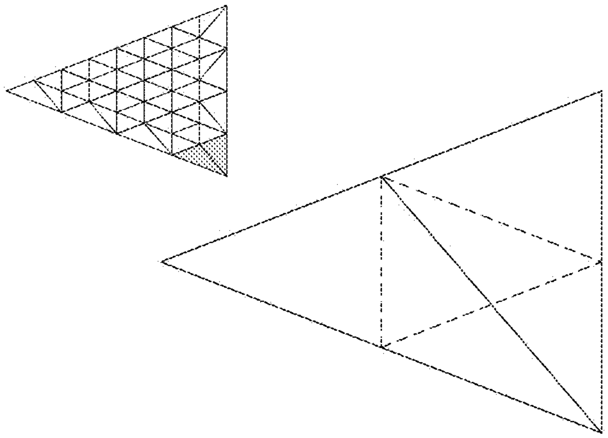

FIGS. 8A-8B, as already described, provide one example of how edge decimation can be used to define a watertight mesh of μ-triangles, while allowing mesh resolution to vary across the mesh of μ-meshes. In the decimation scheme, groups of four triangles are replaced with three, two, or one triangle(s), depending on the circumstance. See FIGS. 9A-9C. FIGS. 9A and 9B show the group of four triangles shown in FIG. 9C being replaced with two triangles and three triangles, respectively. Note that in the case where four triangles of FIG. 9C are replaced by one can only occur if the starting resolution is itself just four triangles.

Figure 10A:
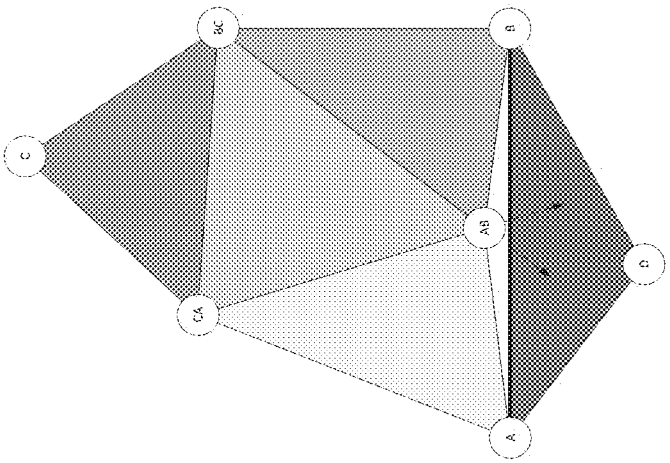
FIGS. 10A-10B illustrates example T-junction scenarios that can occur in μ-meshes, according to some embodiments.
Figure 10B:
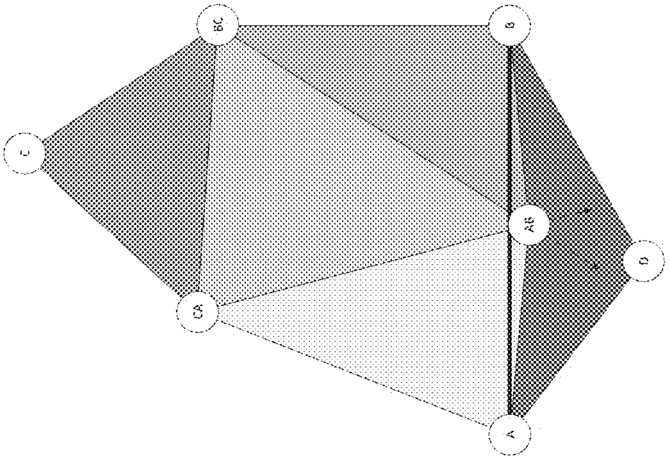
Figure 11A:
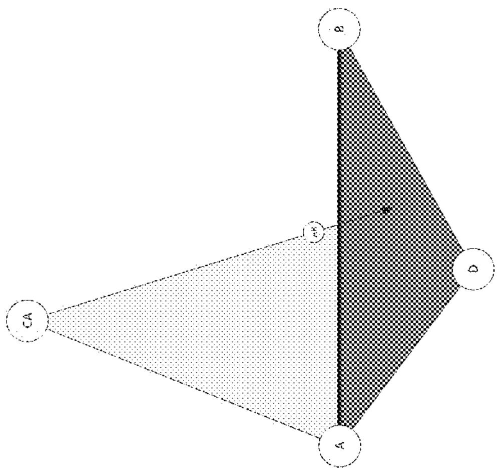
FIGS. 11A-11C illustrate example handling of three T-junction triangles according to some embodiments.
Figure 11B:
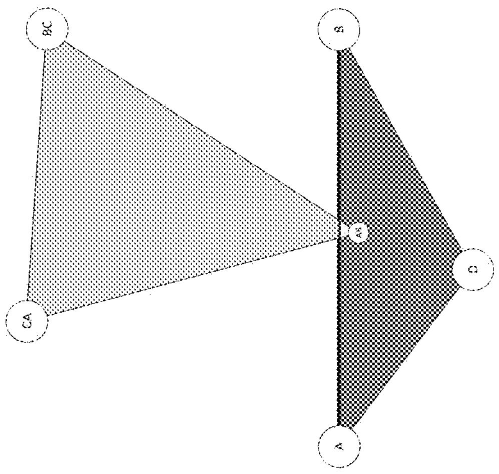
Figure 11C:
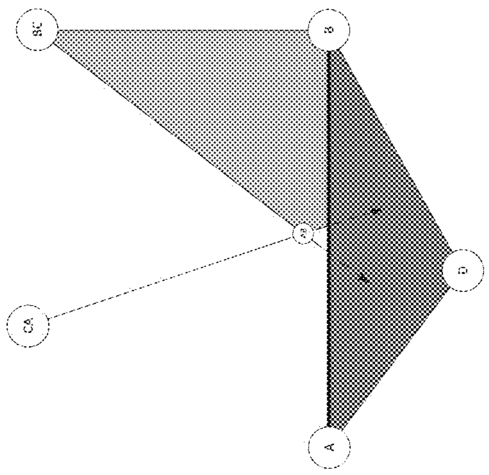

In an alternative to edge decimation, modified line equations can be used to ensure watertight boundaries between adjacent μ-meshes. In this technique, the line equations of a triangle corresponding to a μ-mesh can be used to compute the intersection of a ray (or pixel center) with that triangle. When a T-junction exists, a vertex of a given triangle does not lie exactly on the edge it is implied to lie on. FIGS. 10A-10B illustrate a group of four triangles adjacent to a single triangle, and illustrate, in an exaggerated fashion, the position of the vertex in the center of the edge shared by the three triangles at the bottom of the group of four with its single neighbor. The vertex AB will lie above or below the edge where it is forming a T-junction, this leaves a gap or double hits (pixels that are visited twice). In the above-described solution using decimation, the three triangles along the edge were replaced with two triangles so that the T-junction no longer exists. In this scheme using line equations, extra/different line equations are used to avoid the gap or double hits. Each of the three triangles is discussed in turn. When processing triangle <A, CA, AB>, line equations for edges [A, CA], [CA, AB], and [B, A] are used. By using equation [B, A] instead of [AB, A], any gap between <A, CA, AB> and [A, B, D] is avoided (FIG. 11A). When processing the central triangle <CA, BC, AB>, the three usual line equations associated with these vertices, augmented by a fourth line equation [B, A] are used. The fourth line equation trims off the tip of the central triangle if it happens to extend below edge [B, A] due to quantization or rounding (FIG. 11B). For the third triangle [AB, BC, B], four line equations are used as well: [B, A], [AB, BC], [BC, B], plus [AB, CA]. Adding [AB, CA] to the line equations trims off the tip of the triangle that would cause double hits, because it overlaps triangle <A, CA, AB>. For the configuration shown in FIG. 9C five line equations are required. The four line equations described in handling of FIG. 11B augmented with the equation [A, C] can be used to trim any "poke-through" at vertex CA. Lastly, in the case where all three sides are reduced, a sixth line equation [C, B] can be added to trim at vertex BC.

Isotropic Sampling and Quadrilaterals

As shown in FIGS. 8A-8B, triangles defined to represent geometry can become skinny and with the μ-mesh barycentrically uniform sampling scheme, samples may not be uniformly distributed; they may be closer in one direction than in another. Uniform sampling is more efficient and less prone to sampling or rendering artifacts. While it is possible to construct most μ-meshes with equilateral triangles, some geometric forms, such as small radius cylinders, are better sampled anisotropically. Quadrilaterals inherently accommodate anisotropy, and forms such as cylinders benefit from quadrilaterals' inherent capability for asymmetric sampling. In cases where base meshes may be formed from quadrilaterals or a mixture of quadrilaterals and triangles, quadrilaterals can play this anisotropic role. Note that quadrilateral-only meshes may have problems with "subdivision propagation". The subdivision to refine one face of a mesh, may require the subdivision of neighboring faces to avoid the introduction of T-junctions. The subdivision of those faces propagates to their neighbors and so forth, in a manner similar resolution propagation.

Level of Detail (LOD)

As described above, μ-meshes are regular meshes with a power-of-two number of segments along their perimeters. In some embodiments, hardware or software may very efficiently extract watertight, lower LODs through simple decimation of the μ-mesh. A 64μ-triangle mesh may be treated as 16μ-triangle mesh, a 4-triangle mesh or as a single triangle, simply by omitting vertices. In its simplest form, uniform decimation trivially preserves watertightness. The use of power-of-two decimation also simplifies rendering with adaptive LOD in the rasterization pipeline.

The capability to have multiple LOD can be advantageously utilized by applications making use of the μ-mesh structures. For example, when ray tracing, the desired LOD can be specified with each ray, as a part of instance state, global state, or as a function of traversal parameters, to adaptively select different LOD based on different rendering circumstances.

Displacement Maps

As described above, a μ-mesh DM may be a grid of scalar values that are used to calculate the positions of μ-vertices. Displacement maps and their example implementations are described in greater detail in concurrently filed U.S. Application No. 17946563 "Displaced Micro-meshes for Ray and Path Tracing" which is herein incorporated by reference in its entirety.

Figure 12B:
FIGS. 12A-12B illustrate a displacements map (DM) rendered as a height field, according to an embodiment.
Figure 12A:
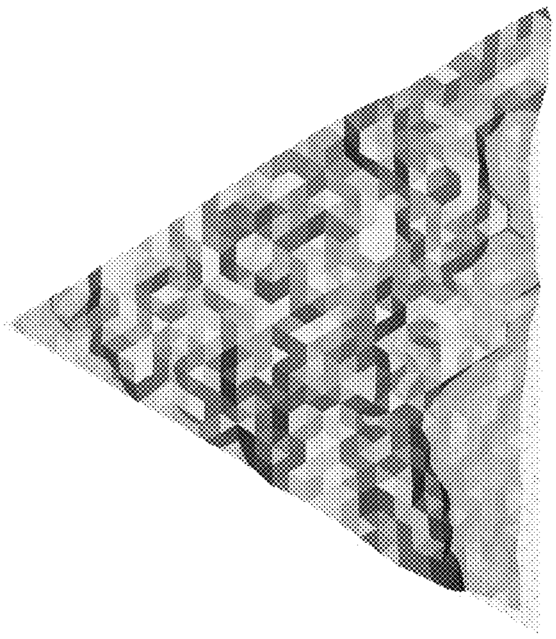

FIG. 12A-12B illustrates a DM rendered as a height field. The μ-vertices are computed by linearly interpolating the vertices of the base triangle as well as the displacement directions FIG. 13A-13D. Displacement directions may be optionally normalized and then scaled by displacement values retrieved from the DM.

Figure 13A:
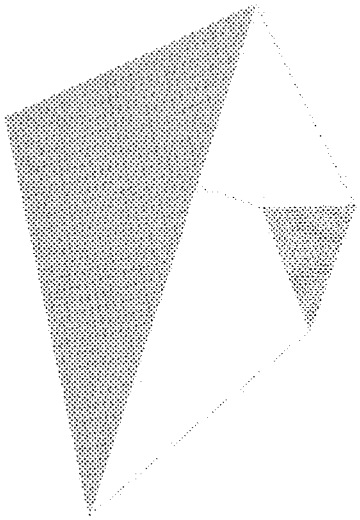
FIGS. 13A-13D illustrate example of linear and normalized interpolated displacement vectors, according to some embodiments.
Figure 13B:
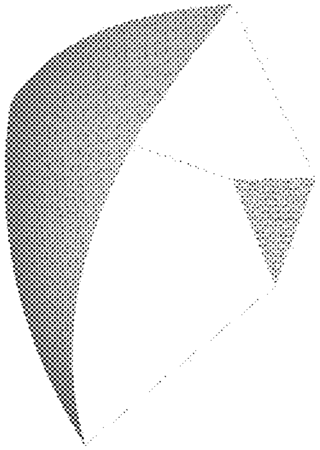
Figure 13C:
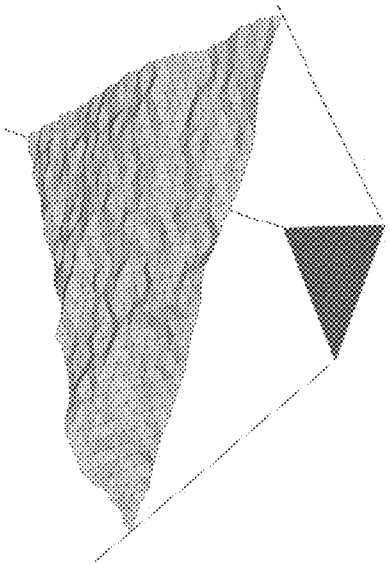
Figure 13D:
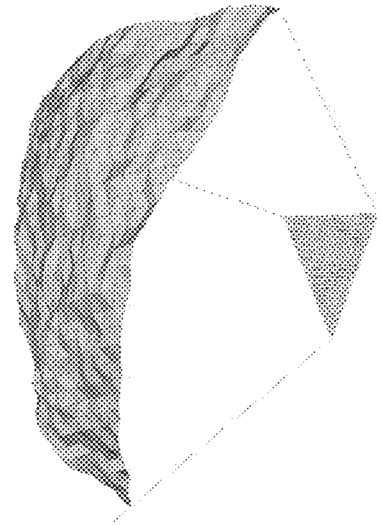

The effect of renormalization is illustrated in FIG. 13A-13D, where pure linear interpolation is flat (shown in FIGS. 13A-13B) and renormalization can yield a curving effect (shown in FIGS. 13C-13D).

Renormalization is practiced in the film industry when modeling geometry with displaced subdivision surfaces. This is because the direction of displacement is determined using the normal to the subdivision surface. When modeling geometry using displacement mapped triangles, these vectors, which are referred to as displacement vectors, are explicitly specified. Like the normalized displacement vectors, the scalar displacements stored in the DM are specified/defined in the range from zero to one. As a result, the final displacement value must be mapped to the range appropriate for the geometry being modeled. For a base mesh, displacement vectors, and μ-triangle mesh, the range of required displacement values, $d_{min}$ to $d_{max}$ are computed. From $d_{min}$ and $d_{max}$ a mesh-wide scale and bias used in the displacement calculation can be computed as follows:

$$\text{bias} = d_{min} \qquad (0.1)$$

$$\text{scale} = d_{max} - d_{min}.$$

Given a displacement scalar u, and interpolated base position $\vec{b}$ and displacement direction $\vec{d}$ as $$\hat{d} = \frac{\vec{d}}{\|\vec{d}\|} \qquad \text{(optional)}$$

a μ-vertex $\vec{v}$ can be computed as $$\vec{v} = (\text{scale}\, u + \text{bias})\hat{d} + \vec{b} \qquad (0.2)$$

If the interpolated displacement vectors $\vec{d}$ are not renormalized, then a useful degree of freedom may be retained. Note that renormalization reduces from three degrees of freedom to two. An alternative formulation that obviates scale and bias is discussed below.

Prismoid—An Alternative Representation

If the interpolated displacement vectors $\vec{d}$ are not renormalized, an alternative equivalent representation that does not use mesh-wide scale and bias can be derived. Details of the transformation where triangle vertices $\vec{p}_l$ that correspond to values of u equal to 0.0 and 1.0 can be pre-computed are provided below:

$$\overrightarrow{p_{0\iota}} = (0.0\ \text{scale} + \text{bias})\overrightarrow{d_\iota} + \rightarrow b_\iota \qquad (0.3)$$

$$\overrightarrow{p_{1\iota}} = (1.0\ \text{scale} + \text{bias})\overrightarrow{d_\iota} + \overrightarrow{b_\iota}$$

In this representation, triangles $\vec{p}_0$ and $\vec{p}_1$ form a prismoid that fully contains the μ-mesh, and the barycentrically interpolated points on these bounding triangles can be linearly blended to compute the final μ-vertex:

$$\vec{v} = (1-u)\overrightarrow{p_0} + \overrightarrow{up_1} \tag{0.4}$$

Figure 14B:
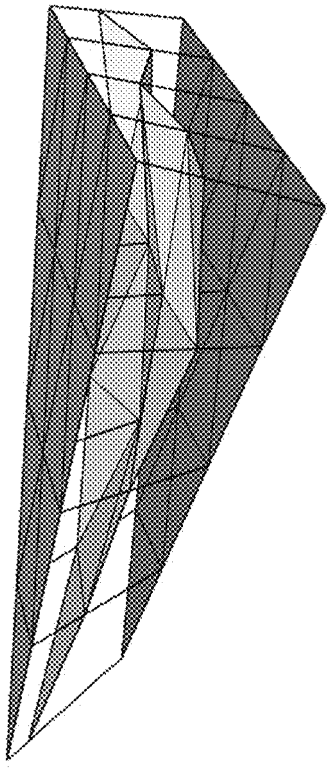
FIGS. 14A-14B illustrate base and displacement in comparison with prismoid specification, according to some embodiments.
Figure 14A:
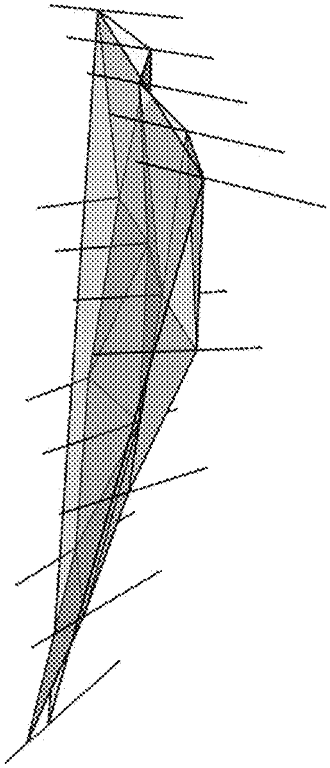
Figure 15:
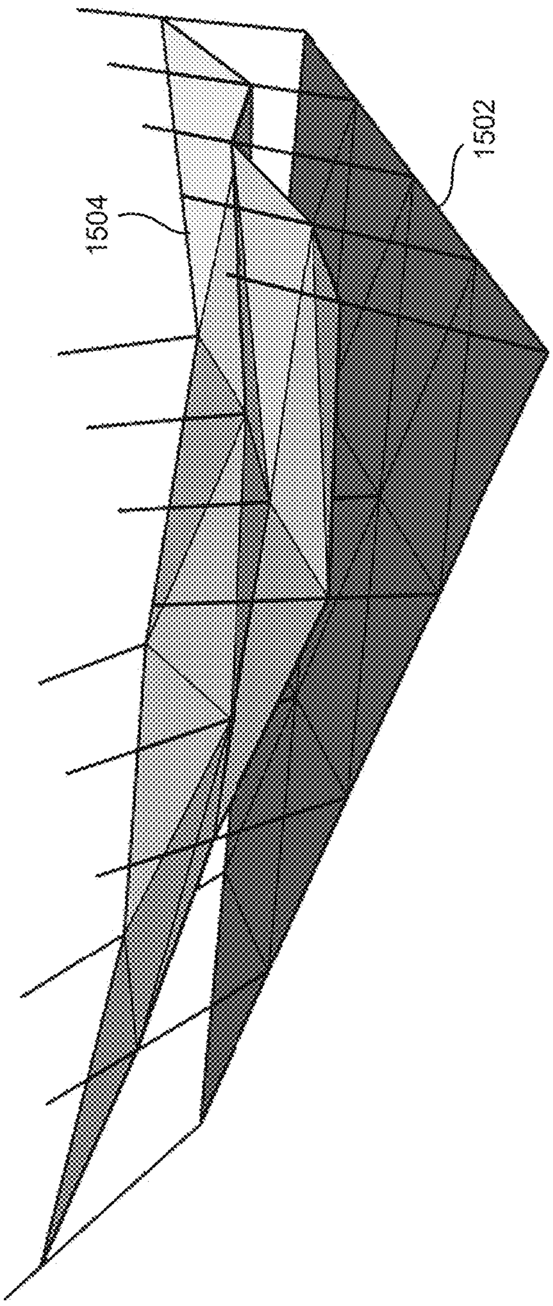
FIG. 15 illustrate a zero-triangle plus displacement vector specification, according to some embodiments.

FIGS. 14A-14B illustrate the two representations: base and displacement (in FIG. 14A) vs. prismoid specification (in FIG. 14B). A third representation is a combination of the two above-described representations. This third approach is useful since it makes use of the extra degree of freedom available when not renormalizing, while using a representation whose form is familiar to developers/users. The third approach is graphically shown in FIG. 15 where displacement vectors are added to the so-called zero-triangle 1502 to form the one-triangle 1504. Linear interpolation of equation (0.4) becomes a weighted add of the interpolated displacement vector:

$$\vec{v} = \overrightarrow{p_0} + \vec{d}u. \tag{0.5}$$

Numerical Precision

The goals for the μ-mesh representation in example embodiments include both compactness and precision. A high-quality representation will be both compact and precise. The choices for specification precision reflect these goals. Geometry is specified on an arbitrary scale while taking advantage of the fact that the base mesh approximates the fine mesh of μ-triangles. In an example embodiment, the base mesh is computed using 32-bit floating point (e.g., IEEE floating point). The displacement vectors are specified using 16-bit floating point since they are offset from the base mesh. Similarly, the zero-triangle plus displacement representation may use these two precisions. In some embodiments, the prismoid representation uses 32-bit floating point for both $\vec{p_0}$ and $\vec{p_1}$ triangles because they are specified irrespective of scale. Multiple factors may be considered in establishing the precision and format of the scalar displacement values u stored in the displacement map. In some embodiments, fixed-point is chosen because u maps a space of uniform importance. In some embodiments, UNORM representation is chosen because it is a standard graphics format that maps the space from 0.0 to 1.0, inclusive. A UNORM is of the form $u/(2^n-1)$ where u is an n-bit unsigned integer. The size of an uncompressed DM is a consideration when choosing precision levels. In the table shown in FIG. 16, sizes of displacement maps are enumerated as a function of resolution. In the table, with 11-bit UNORMs, the DM for a 64μ-triangle mesh fits efficiently in 64 bytes. The 11-bit value corresponds to the FP16 mantissa (including a hidden bit). UNORM11 is a convenient size for a 64μ-triangle mesh and corresponds to the displacement vectors which are FP16.

Visibility Masks

As described above, a visibility mask (VM, sometimes also referred to as an "opacity micromap") in some example embodiments is a mask that classifies μ-triangles as opaque, unknown, or transparent. The term visibility is used because a ray tracing engine, which is an environment in which the μ-meshes of example embodiments can be used, is a visibility engine and requires a visibility characterization to determine what a ray intersects. When a ray intersects a μ-mesh, the intersection location within the μ-mesh is used to look up the visibility at that location. If it is opaque, then the hit is valid. If it is masked as transparent the hit is ignored. If it is of unknown state the ray tracing engine may invoke software to determine how to handle the intersection. In D3D, for example, the invoked software may be an any hit shader. In contrast to μ-meshes and visibility masks of example embodiments, in conventional techniques individual triangles were tagged as alpha-tested, and software was invoked if any such triangle is intersected. Visibility masks and an example implementation of visibility masks are described in greater detail in concurrently filed U.S. application Ser. No. 17/946,221 "Accelerating Triangle Visibility Tests for Real-Time Ray Tracing" which is already incorporated by reference.

Visibility States—Opaque, Transparent, and Unknown

Figure 17B:
FIGS. 17A-17B show an example leaf image and corresponding 1-bit visibility mask (VM), respectively, according to some embodiments.

VMs used with μ-meshes may be bit masks of one, two or some other number of bits per μ-triangle. The storage requirements for VMs correspond to the μ-triangle counts as summarized in the table shown in FIG. 16, varying with the resolution of the VM. A 1-bit per μ-triangle VM marks each corresponding μ-triangle as either opaque or transparent and does not require software intervention during the tracing of a ray. FIG. 17B shows a 1-bit VM of the image of the branch of leaves shown in FIG. 17A.

Figure 17A:
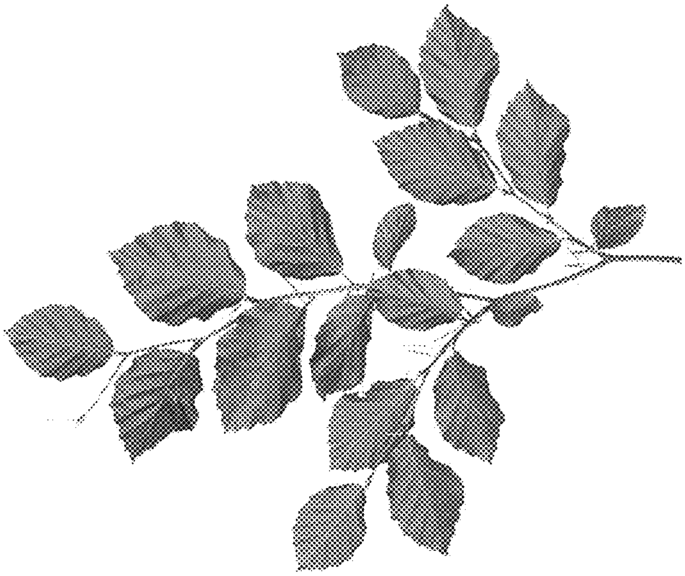
Figure 18B:
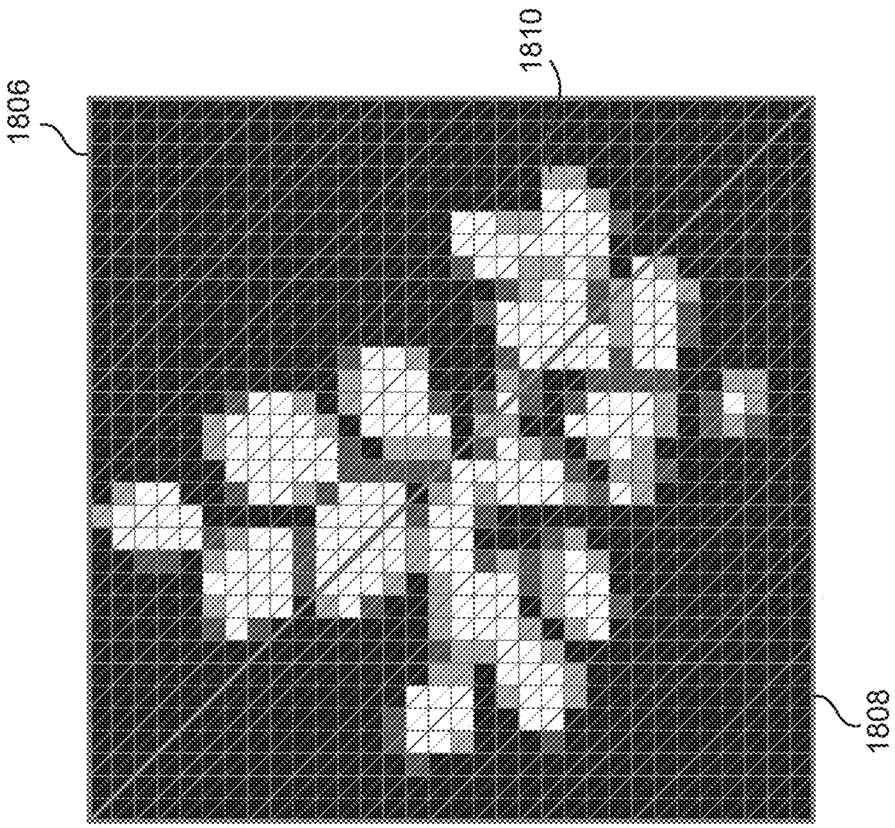
FIGS. 18A and 18B illustrate 2-bit VM examples of differing resolutions of the leaf image of FIG. 17A, according to some embodiments.
Figure 18A:
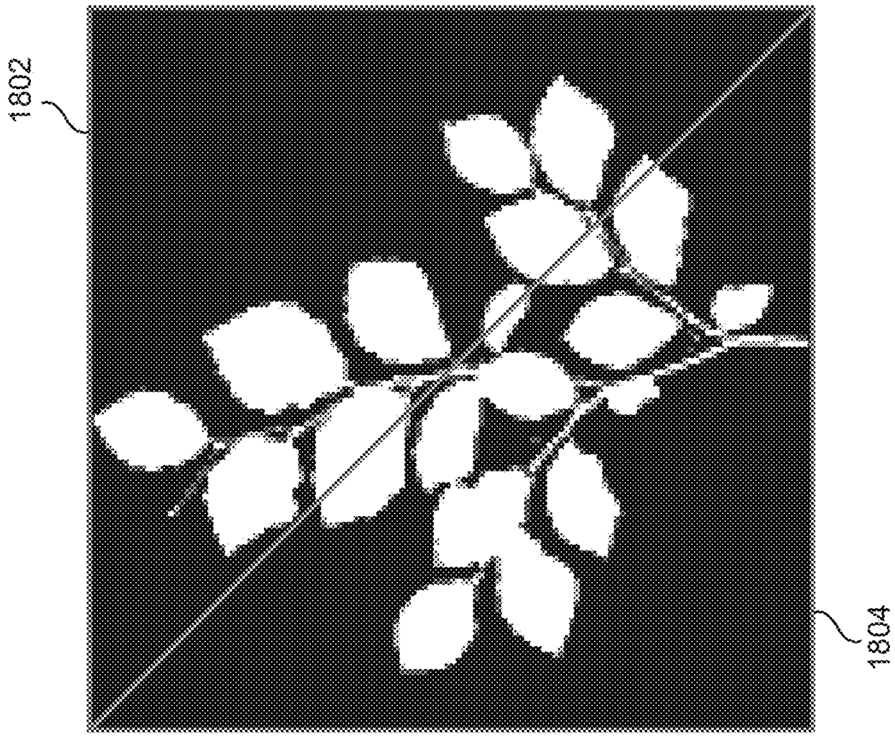

VMs may be high resolution such as shown in FIG. 17A-B where the branch of leaves shown in FIG. 17A is represented with a VM of higher resolution than shown in FIG. 17B. If memory consumption is a concern, the resolution of a VM may be reduced substantially. Resolution reduction often is the most effective form of compression. With resolution reduction, it is possible to retain full rendering fidelity. FIG. 18A shows two 128-bit visibility masks 1802 and 1804 providing 64:1 compression, and FIG. 18B shows two 32-bit visibility masks 1806 and 1808 providing 1024:1 compression. When 1-bit masks such as in FIG. 17B are down-sampled as shown in FIGS. 18A-18B, it can be seen that regions of the mask represent areas of the original mask that are a mix of opaque and transparent. Those areas are shown as gray (e.g., μ-triangle 1810) in FIG. 18B. Also note that in the lower resolution FIG. 18B, the μ-triangles of the mask are shown, in addition to the outline of the two VMs.

Figure 19B:
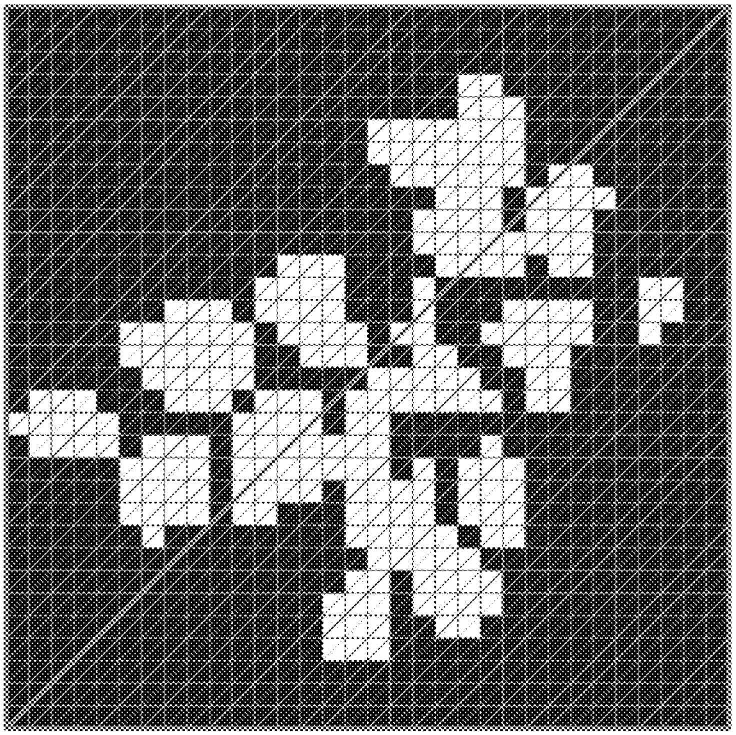
FIGS. 19A-19B illustrate two interpretations of the VM shown in FIG. 18B, one three-state (FIG. 19A), and one two-state (FIG. 19B), according to some embodiments.
Figure 19A:
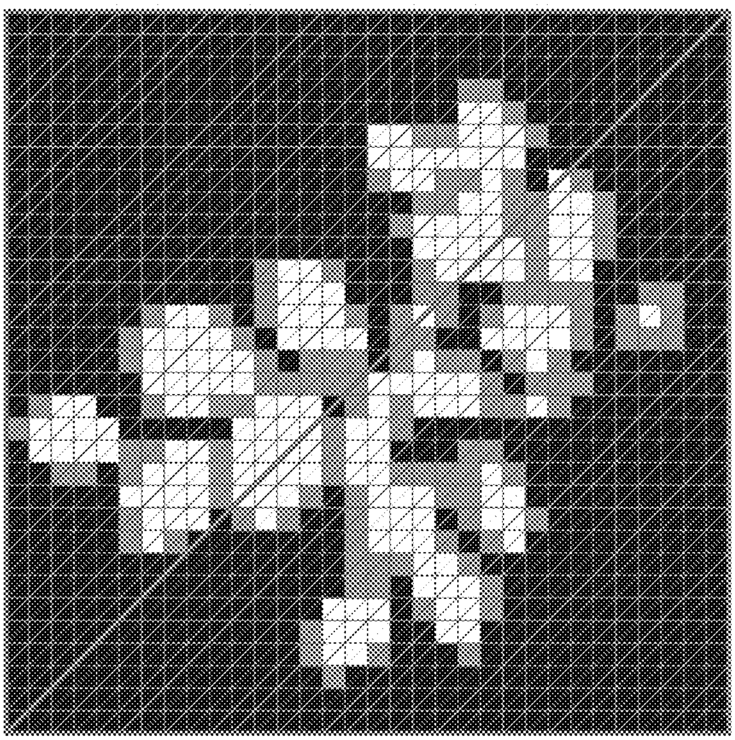

When using down-sampled VMs, the "any hit" shader may be used to resolve the visibility at the same fidelity as the original mask. If a ray intersects a "gray" μ-triangle (in FIG. 18B) then the any hit shader is invoked to determine the outcome. In both reduced resolution examples, most μ-triangles are either opaque or transparent. This means that most of the time a ray intersection does not require invocation of software to resolve the intersection. The 2-bit visibility masks encode four states, which in turn affords some flexibility of interpretation. In some ray-traced effects exact resolution is not required. For example, soft shadows may be resolved using a lower resolution proxy. To facilitate use of such proxies, the four states of a 2-bit VM can be defined as transparent, unknown-transparent, unknown-opaque, and opaque. In one remapping of these states, unknown-transparent is associated with transparent, and unknown-opaque with opaque, and in doing so interpret the 2-bit map as a 1-bit map requiring no software fallback because there are no unknown states. In a second interpretation of the four states, software is invoked when the μ-triangle that is struck is categorized as either of the unknowns. In the latter setting, most rays are resolved without software assistance, but fidelity/accuracy is preserved for any so-called unknown μ-triangle that happens to be intersected. These two remappings are illustrated in FIGS. 19A-19B. FIG. 19A represents the alternative 2-bit mapping to three states: transparent, unknown and opaque, and FIG. 19B shows the mapping to two states: transparent and opaque.

Figure 20B:
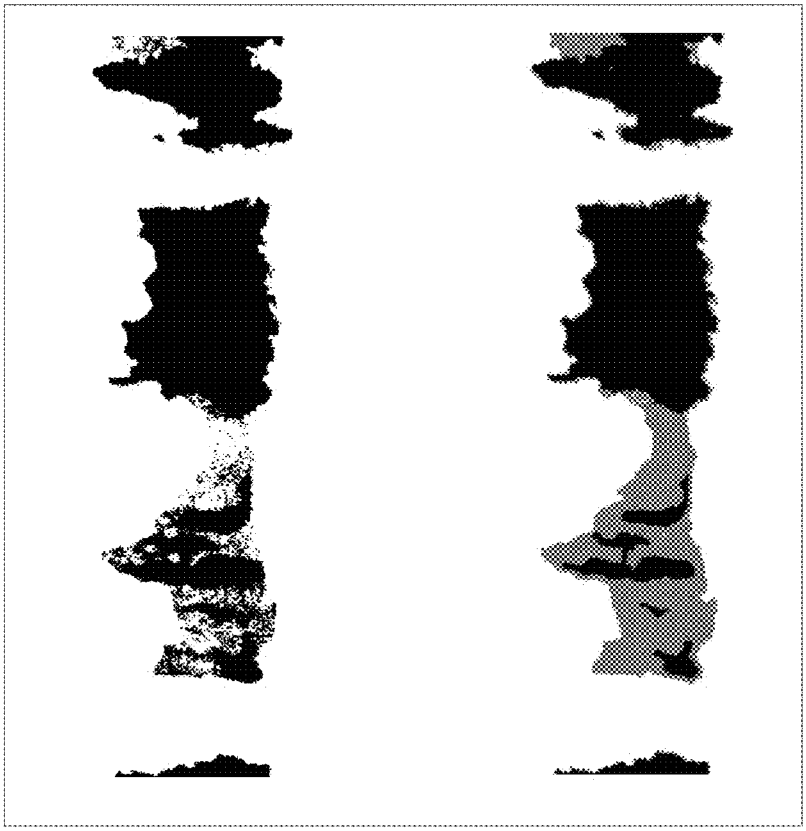
FIG. 20A-20B illustrate an example translucent moss texture with shadow mask (two-state) above and translucency map (three-state) below, according to some embodiments.
Figure 20A:

2-bit encodings can also be used to accelerate the ray tracing of translucent objects. These objects are a mix of transparent, opaque and translucent, where only the translucent portions require software to resolve. Such materials also lend themselves to a simplification when rendering lower frequency/fuzzy effects like shadows where no software is required for tracing. In FIGS. 20A-20B, shadow and translucency maps are illustrated with an example. FIG. 20A shows a translucent moss texture for which FIG. 20B shows the shadow mask above and translucency map below Representation Summary μ-meshes, as described above, is a structured representation for geometry. The description has focused on the representation which is a mesh of power-of-two regular meshes of μ-triangles. In some embodiments, the positions of the μ-triangles are computed using interpolated base-mesh positions and displacement vectors and scalar (e.g., UNORM11) displacements. The visibility of μ-triangles is specified at an independent μ-triangle resolution and can simultaneously express binary visibility as well as software resolved visibility. The highly structured representation lends itself to compact representation and efficient rendering. In some embodiments, a VM may be applied to generic triangles effectively treating them as μ-meshes. When not using displacements, only the barycentric coordinate system of any triangle is required for VM use.

Materials, Intrinsic Parameterization, Palettes, VM and DM Reuse and Mirrored Support Computer graphics rendering systems often make use of material systems, where materials are composed of various properties grouped together. Material properties include texture maps controlling shininess, albedo color, as well as alpha and displacement. Conventional alpha textures may map to μ-mesh VMs of example embodiments, and displacement maps correspond to μ-mesh DMs of example embodiments. A triangle references conventional textures using texture coordinates, where these auxiliary coordinates define the mapping between triangle and texture map. Creating texture coordinates is a significant burden in the content creation pipeline of a graphics system. Unlike conventional texture maps, VMs and DMs use the intrinsic coordinate system of triangles, barycentric coordinates. Consequently, VMs and DMs do not require the creation or use of texture coordinates. The idea of using the intrinsic parameterization can be used for other texture types, corresponding closely to DMs, where values are linearly interpolated like the facet of a μ-triangle. This linear interpolation corresponds to the bi-linear interpolation within a single level of a texture MIP chain. Tri-linear interpolation of attributes is naturally supported by linearly interpolating between μ-mesh maps of adjacent resolutions. A benefit of this scheme is avoiding the cost of creating texture coordinates.

As noted above, resources like textures and VMs and DMs can be grouped into materials. When instances of an object are rendered, it is common to associate a potentially different material with each object instance. Because VMs and DMs are material properties that help define the visibility of an object, a mechanism may be included in example embodiments to associate different materials (e.g., groups of VMs and DMs) with ray traced instances. When material considerations do not exist, a triangle in an example embodiment may directly reference its associated DM and or VM. Treating DMs and VMs as material properties, however, each triangle in an example embodiment references its associated resources via an index into an array of VMs and DMs. A given material has an associated pair of arrays of VMs and DMs. When an instance is invoked using a material, the corresponding VM and DM arrays are bound.

Figure 21:
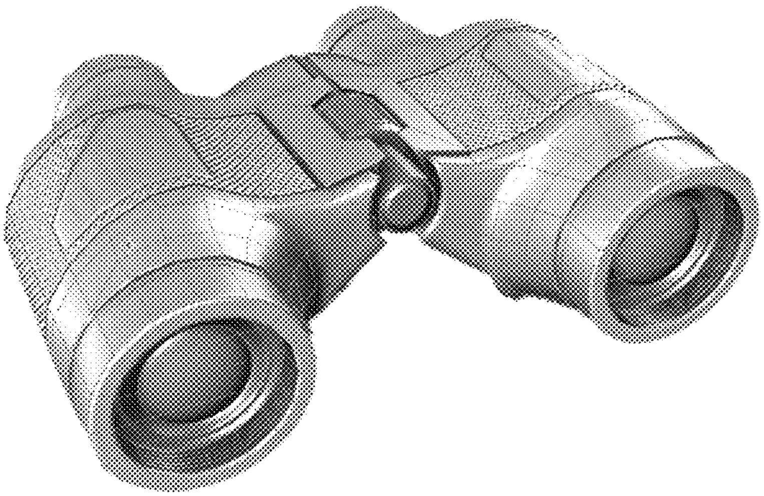
FIG. 21 shows an example of mirrored modeling, according to some embodiments.

Another form of DM reuse may stem from a common CAD construction technique where object components are exact mirror images of each other, as shown in the mirrored modeling example of FIG. 21. Triangle meshes, representing objects, are normally oriented such that all triangles have the same vertex ordering when viewed from the outside. Vertices are organized in clockwise (or counterclockwise) order around the triangle that they define. The mirroring operation used in model construction, naturally changes vertex order, making mirrored triangles appear to face in the opposite direction. To restore consistent triangle facing, mirrored vertex order may be reversed. However, because DM and VM addressing is derived from vertex ordering, it must be known when vertex order has been modified in order to correct for mirroring operations. In example embodiments, a DM (or VM) may be reused across normal and mirrored instances because the map/mask addressing can be configured to take mirroring into account.

Compression

The μ-mesh representation, its intrinsic parameterization, and the incorporation of DMs and VMs were described above. When highly detailed geometry is described, it is important that the description be as compact as possible. The viability of detailed geometry for real-time computer graphics relies on being able to render directly from a compact representation. In the following sections, the compression of VMs and DMs is discussed. Because both are high quality μ-mesh components, they may be compressed by taking advantage of inherent coherence. DMs and VMs can be thought of as representatives of data associated with vertices and data associated with faces, respectively. These two data classes may be understood as calling for different compression schemes, both lossless and lossy. Where a lossless scheme can exactly represent an input, a lossy scheme is allowed to approximate an input to within a measured tolerance. Lossy schemes may flag where an inexact encoding has occurred, or indicate which samples failed to encode losslessly.

When rendering using data from a compressed representation, example embodiments are enabled to efficiently access required data. When rendering a pixel, associated texels in example embodiments can be directly addressed by computing the memory address of the compressed block containing the required texel data. Texel compression schemes use fixed block size compression, which makes possible direct addressing of texel blocks. When compressing VMs and DMs in some example embodiments, a hierarchy of fixed size blocks are used with compressed encodings therein.

With fixed size memory blocks, some μ-meshes may have too many μ-triangles to be stored in one fixed size block. Such a μ-mesh can be divided into sub-triangles of same or varying size so that each sub-triangle has all its μ-triangles stored in a respective fixed size block in memory. In one embodiment, a sub triangle is a triangular subdivision of a surface a base triangle defines. The decomposition of a base triangle or associated μ-mesh into sub-triangles may be determined by the compressibility of the associated content of the μ-mesh, and in some cases visibility masks or displacement maps associated with the μ-mesh.

Visibility Mask Compression

In many scenarios VMs are very coherent in that they have regions that are fully opaque and regions that are fully transparent. See, e.g., the example VMs in FIG. 22. In example embodiments, compression of VMs first consider lossless compression and then in order to meet fixed size and addressability requirements, these algorithms are converted to more flexible, lossy schemes. The decompression algorithms used during rendering are amenable to low cost, fixed-function implementations.

VM Compression—Quadtree Bit Mask Encoding

Figure 22:
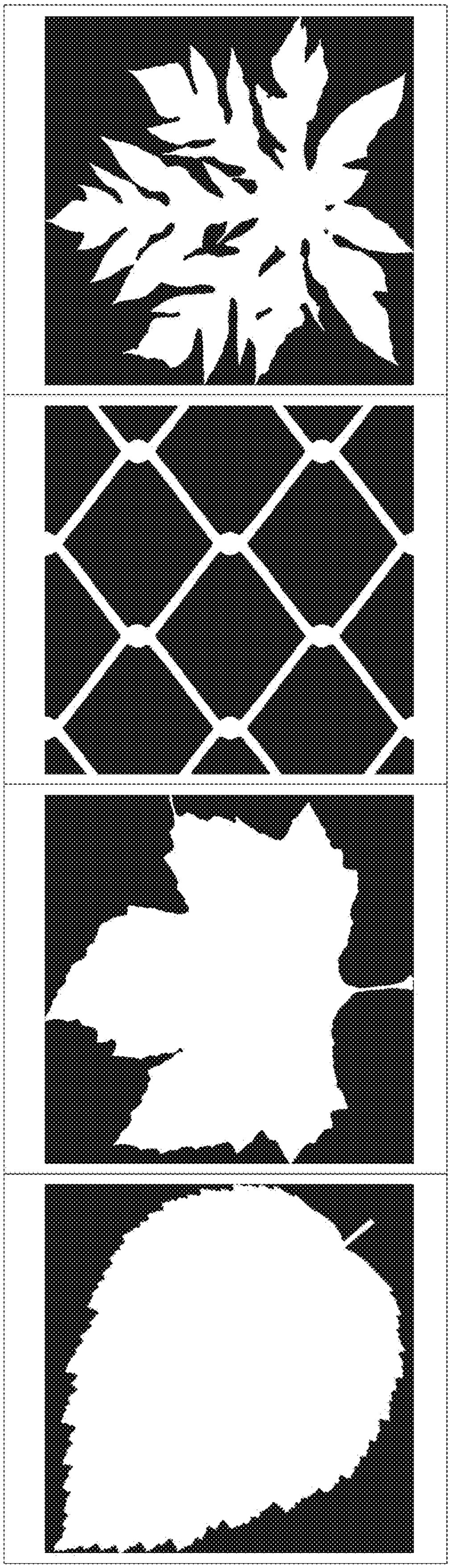
FIG. 22 illustrates four example VMs, according to some embodiments.
Figure 23B:
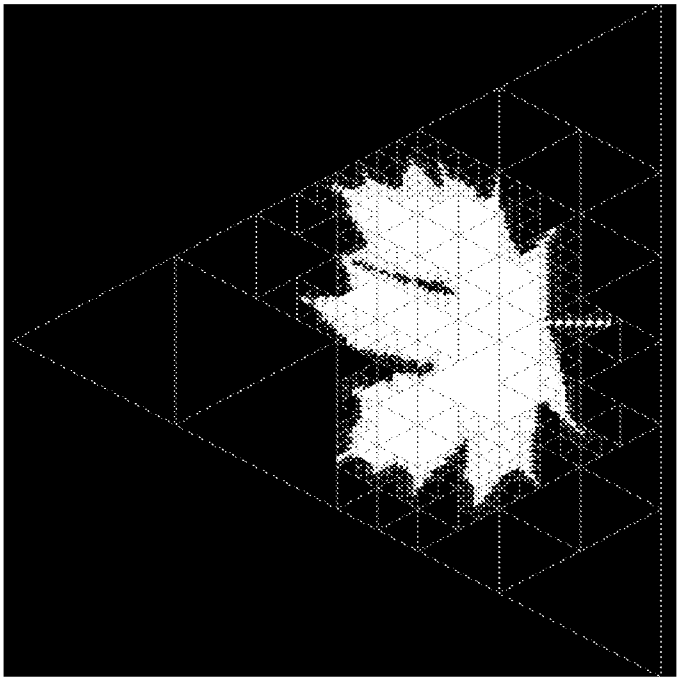
FIGS. 23A-23B graphically illustrate how a quadtree can be depicted over square (FIG. 23A) and triangular domains (FIG. 23B), according to some embodiments.
Figure 23A:
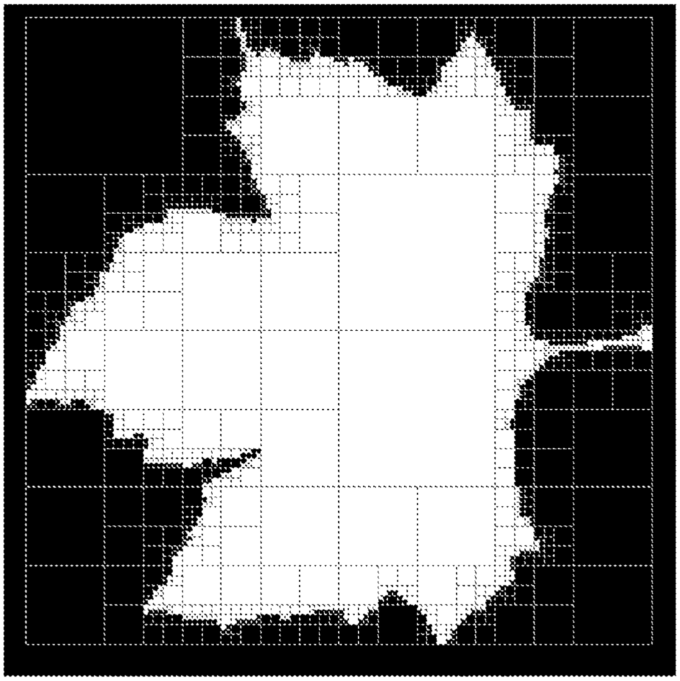

Considering the maple leaf of FIG. 22, its shape can be described using a tree of squares, such that the tree efficiently captures homogeneous regions as shown in FIG. 22. In FIG. 23A-23B, a quadtree is depicted over square (FIG. 23A) and triangular domains (FIG. 23B). As can be observed, in areas of high coherence, comparatively large regions (square or triangular) of homogeneous texels can be represented with a single square or triangle. For μ-meshes defined over a triangular domain, a triangular quadtree is used, but the algorithms may apply equally to other hierarchical subdivision schemes.

Figure 24:
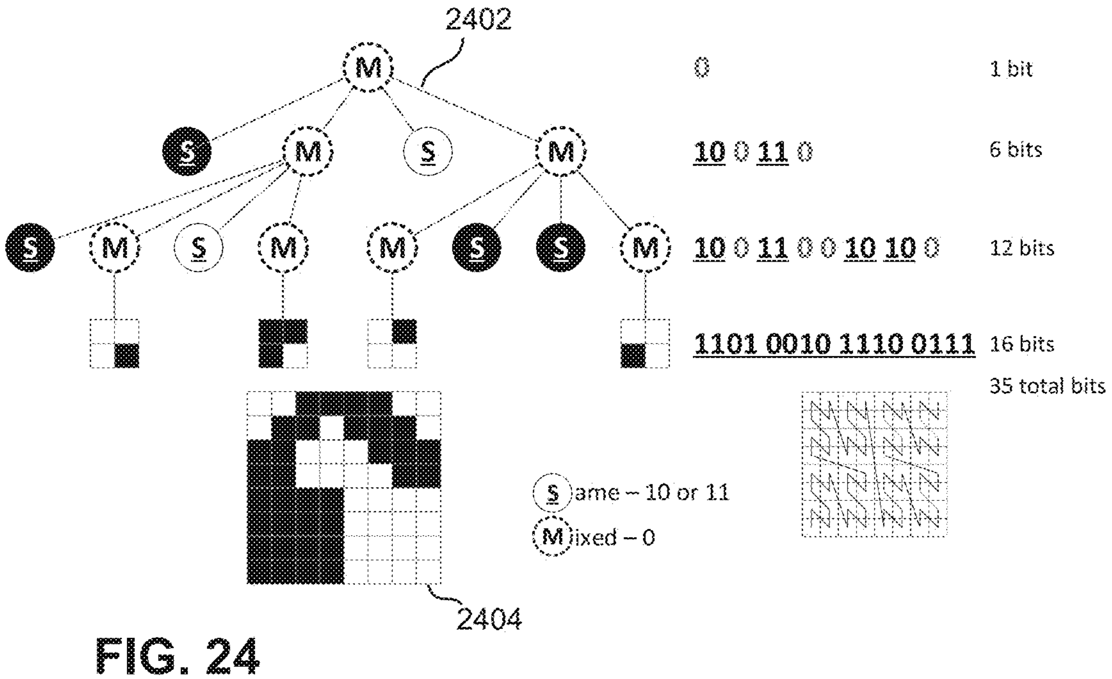
FIGS. 24-25 show a quadtree-based coding scheme where the nodes of the tree compactly describe the image, according to some embodiments.

In FIG. 24, a quadtree-based coding scheme where the nodes of the tree 2402 compactly describe the image is illustrated. An example 64-bit image 2404 to be coded is inset. The image is of known resolution, and therefore the subdivision depth (three levels) is known. Three node types (e.g., opaque, transparent, translucent/unknown) are used to code regions as a mix of zeros and ones, all zeros, all ones, or four-bit leaf values. The single node at the first level encompasses all 64-bits and thus includes both opaque and transparent texels thereby yielding a node type of unknown. At the second level, the 64-bits is divided to 4×4 squares, and is considered according to the traversal pattern to starting from the bottom left square and moving to the top left, bottom right and top right squares in sequence. The bottom left and bottom right squares are all opaque and all transparent respectively and are encoded as 10 and 11 respectively. The traversal order is shown at the bottom right of FIG. 24. At the third level, only the mixed second level squares (squares that have both opaque areas and transparent areas) are further split. Thus, for the third level, the top left and top right 4×4 squares at the second level are each further split to four 2×2 squares each, thereby introducing eight new nodes at level three. As shown to the right of the figure the coding of levels one, two and 3 can be done with 1, 6 and 12 bits, respectively. In addition to the three levels of the tree, the 2×2 square area for each unknown node at the third level is additionally encoded as a leaf node. Thus, as shown to the right in the figure, the 64-bit example image 2404 is coded with 35 bits.

Figure 25:
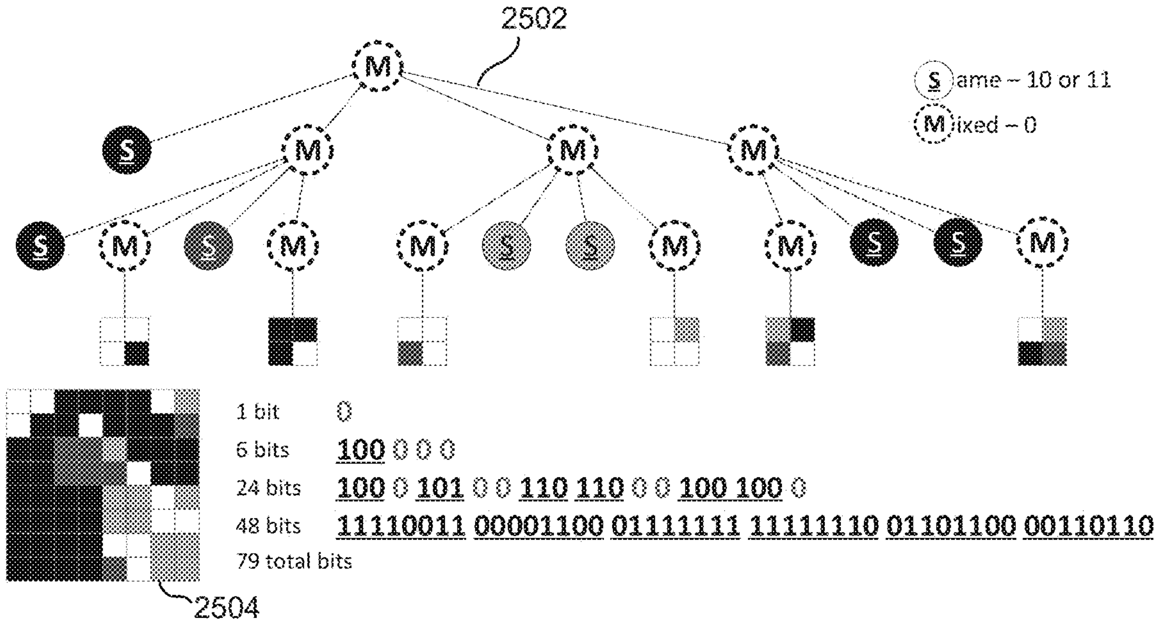

When discussing VMs above, cases where more than three node types are useful for representing things like transparency, or simply uncertainty were described. In these cases, four node types may be used in some embodiments, opaque, opaque-unknown (heavy shadow), transparent and transparent-unknown (soft shadow), and eight-bit leaf values. FIG. 25 illustrates a quadtree 2502 to encode the image 2504. Now, a node classified as "same" can be all opaque, all opaque-unknown, all transparent-unknown or all transparent. Each leaf node in this configuration requires eight bits because each of the four texels require two bits to be capable of describing one of the four types. Thus, as shown in the FIG. 25, the encoding of the 64-bit image 2504 using the four node type configuration requires a total of 79 bits.

Since, as shown in FIGS. 24-25, the lossless coding of an image is not of fixed size, lossless coding is less well-suited to direct use in rendering. Specifically, a mask encoding may be larger than can efficiently be read in a single operation. In the next section, techniques to adapt the hierarchical coding scheme to a fixed bit-budget algorithm is discussed.

VM Compression—Coding to a Budget

The schemes described thus far permit the exact encoding of two and four state masks, but the encoded result is of unknown size, which may be too large. Note that the bits of the tree closer to the root represent larger regions. If a fixed memory is allocated in breadth-first fashion, from root to leaves, the largest areas of the mask are naturally encoded first because the larger areas are represented at the higher levels of the tree. For example, if the budget is 48 bits, then all but the last four 2×2 blocks of mask values, or ¾ of the map are captured. When a rendering algorithm is operating on the encoding, any portions of the tree that get truncated are treated as unknown. One interesting consequence of this bit allocation scheme is that it establishes the mask resolution which fits within a fixed budget. An arbitrarily high-resolution mask can be taken and encoded doing breadth-first, greedy allocation, and representable resolution corresponds to what level of the tree encoding was reached. For example, if the fourth level of the tree is reached with the available bit budget, then the subject mask captures information to a resolution of 44=256μ-triangles.

VM Compression—Run-Length Encoding

The tree-based encoding is an efficient, compressed representation of a VM, however its structure does not lend itself to direct addressing. Some applications may be well-supported by this fixed budget compression scheme. However, applications performing point queries may require a more direct lookup mechanism to avoid the inefficiency of repeated recursive reconstructions. Here a run-length encoding scheme that is more amenable to direct addressing is described. In general, run-length encoding schemes use symbol-count pairs to describe a sequence of symbols more compactly. These symbol-count pairs may be referred to as "tokens". For addressability reasons, fixed bit-width tokens may be used.

The mapping of a visibility mask to a linear sequence of symbols is discussed in the next section. To lookup a specific mask value, its location in the sequence (its index) is computed and then which token represents its value is computed. The token is looked up by performing a prefix sum over the list of token lengths, to find which token represents the value at the computed index. A prefix sum is a known efficient parallel (logarithmic depth) algorithm for finding the sum of a sequence of values. As all partial sums are computed, the index interval for each token is computed and tested against the index whose token value is sought.

The size of a token is determined by the number of bits required to specify the length of run plus the number of bits required to specify the value within the sequence of values. The number of run bits can be determined by scanning the token sequence and finding the longest run and allocating $\lceil \log_2[n] \rceil$ bits. This approach to run-bit calculation may be inefficient since a minority of runs may require the worst-case number of bits. Instead, an optimal number of bits is chosen, using multiple tokens to code runs longer than supported by the number of run-bits allocated. In this manner, the total number of tokens increases slightly, but the number of bits per token is reduced by a larger degree, reducing the overall number of bits required to encode a sequence.

The number of bits required to specify the value, in sequence, can take advantage of the nature of run-length encoding. Each run represents a sequence of equal values, a run is only ended if the value changes. If a 1-bit sequence, a list of zeros and ones, is encoded, coding the value can be avoided altogether. The starting value of the sequence is recorded, and toggling between the value is performed as the tokens are parsed. However, above it was noted the optimal number of run-bits may be fewer than required by the longest symbol value run in the sequence. Long runs may require being broken into multiple runs of the same value. To accommodate repeated values when coding long runs, runs of zero length are reserved to indicate a maximal run ($2^n-1$) to be followed with a token continuing the same run value, making up the balance of the long run. Note that some runs could require multiple maximal tokens for their encoding. In some use cases, VMs exist with two, three and four possible states: opaque-transparent, opaque-unknown/translucent-transparent, and opaque-unknown/opaque, unknown/transparent, transparent. How two states or values can be coded without additional bits was described above. Three states can be coded similarly, using a single bit to indicate which of the two other states a transition is to. Since there are always only two possible next states, a single bit is used to indicate which state or symbol value is next in sequence. When coding runs longer than expressible with the run-bits, the next state is held unchanged, thus the value bit can be used to indicate single or double length long runs, improving the efficiency of long run coding. Lastly when coding four state sequences, there is a further opportunity to code long runs. To run-length encode a four state sequence, three "next states" may be observed. For this coding, tokens are made up of a 2-bit control and n run-length bits. The 2-bit control encodes the three possible next states or indicates a long run. Because the 2-bit control encodes long runs, the run bits specify runs of length from 1 to $2^n$. And in the case of a long run, the n run-length bits code a multiple of maximal runs, $l2^n$. Since l can vary from 1 to $2^n$, the long run can encode from $2^n$ to $2^{2n}$, which may be followed by a run of length 1 to $2^n$ to complete a long run between $2^n+1$ and $2^{2n}+2^n$. This is useful since it means the optimal number of run bits can be smaller, achieving improved overall compression.

VM Compression—Run-Length Coding to a Budget

When using a run-length encoded mask, a prefix sum over the encoded stream is performed, taking advantage of the fixed size tokens. To efficiently perform a prefix sum, without requiring multiple memory fetches, the capability is needed to read all the run-length bits, the entire stream, in a single operation. Run-length encodings are inherently of varying length because they are normally lossless. To fix within a fixed memory budget, a scheme is needed to reduce the size of a run-length encoding. Due to fixed bit-length tokens, the number of tokens should be reduced in order to reduce the size or length of the stream. Reducing the token count means introducing data loss and uncertainty which must be resolved in software. This is very similar to the uncertainty or unknown values introduced by reducing image resolution. The adjacent token pair that introduces the least uncertainty is merged. A pair of tokens with a length-one known value adjacent to a run of unknowns introduces one new unknown value, the least possible cost. Merging a pair of length-one known tokens introduces two new mask entries of unknown status. As the merging process proceeds, longer runs may need merging to meet a given budget. The merging process continues until the run-length encoded VM fits within the specified budget, while introducing a minimum of unknown mask entries.

Barycentric Coordinate to Sequence Mapping

Figure 26B:
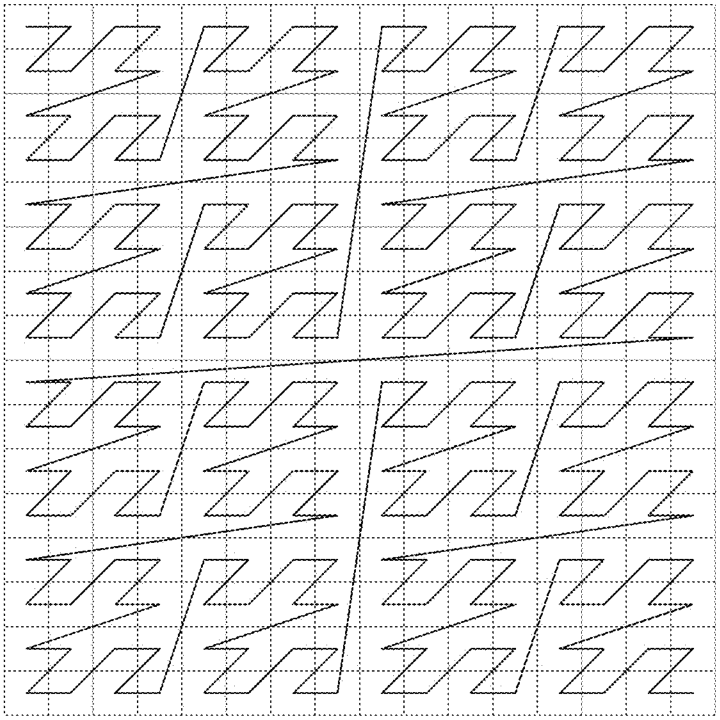
FIG. 26A-26B show an example of Hilbert traversal order (shown in FIG. 26A) and the Morton order (shown in FIG. 26B) which is less coherent than the Hilbert traversal order, but is computationally less costly to compute.
Figure 26A:
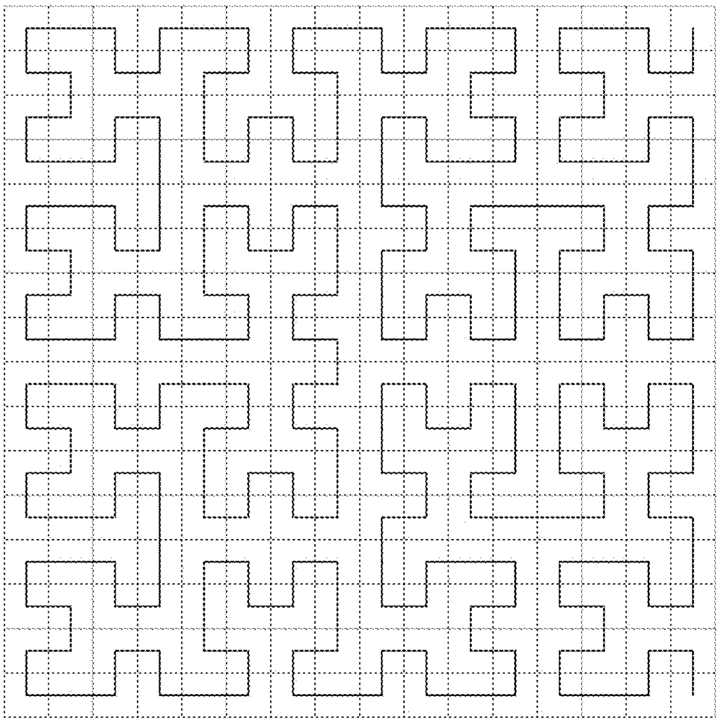

In some embodiments, run-length encoding as described above is used to code sequences of values. A mapping is needed from a VM to a sequence, because a sequence is a list, a one-dimensional list of numbers and a visibility mask is a triangular image of mask values. Run-length encoding is more efficient if the sequence is spatially coherent. The one-dimensional traversal of an image is more coherent if one value is spatially near the next in sequence. For square images two traversal orders are primarily used in example embodiments, Hilbert and Morton. Hilbert traversal order (shown in FIG. 26A) is the most coherent while Morton order (shown in FIG. 26B) is slightly less coherent but computationally less costly to compute. The cost of computation is of importance because a frequent operation takes a two-dimensional coordinate and produces the index of the corresponding mask value.

Figure 28:
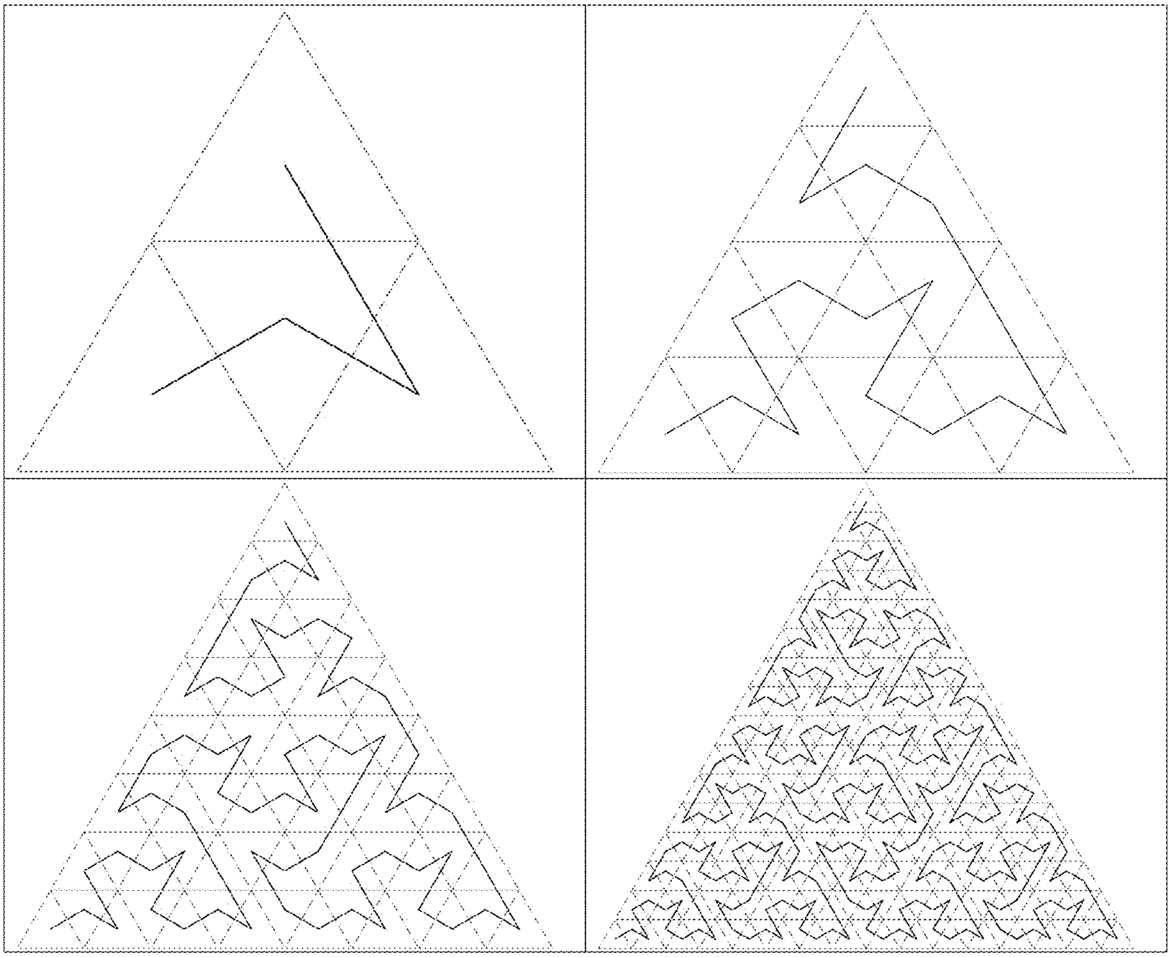
FIG. 28 illustrates the application of the traversal order to μ-meshes of different resolutions, according to some embodiments.

For regular triangular regions like the μ-meshes in example embodiments, a highly coherent traversal order is developed. The traversal shown in FIG. 28 is similar in spirit to a Hilbert curve but is simpler to compute. The computation to go from an index to discrete barycentric coordinates, and from barycentric coordinates to an index is inexpensive.

To support the description, some labeling and terminology is first established. See FIG. 27 that illustrates barycentric coordinates and discrete barycentric coordinates. The variables u, v, and w are used as the barycentric coordinates. Any position within the triangle can be located using two of the three values, because the coordinates are non-negative and sum to one. If the area of the triangle is itself 1.0 then then u, v, and w are equal to the areas of the three sub-triangles formed by connecting the point being located with the three triangle vertices. If the triangle is of greater or lesser area, then u, v, and w represent proportional area. The coordinates can also be interpreted as the perpendicular distance from an edge to its opposite vertex, also varying from 0 to 1.

Figure 27:
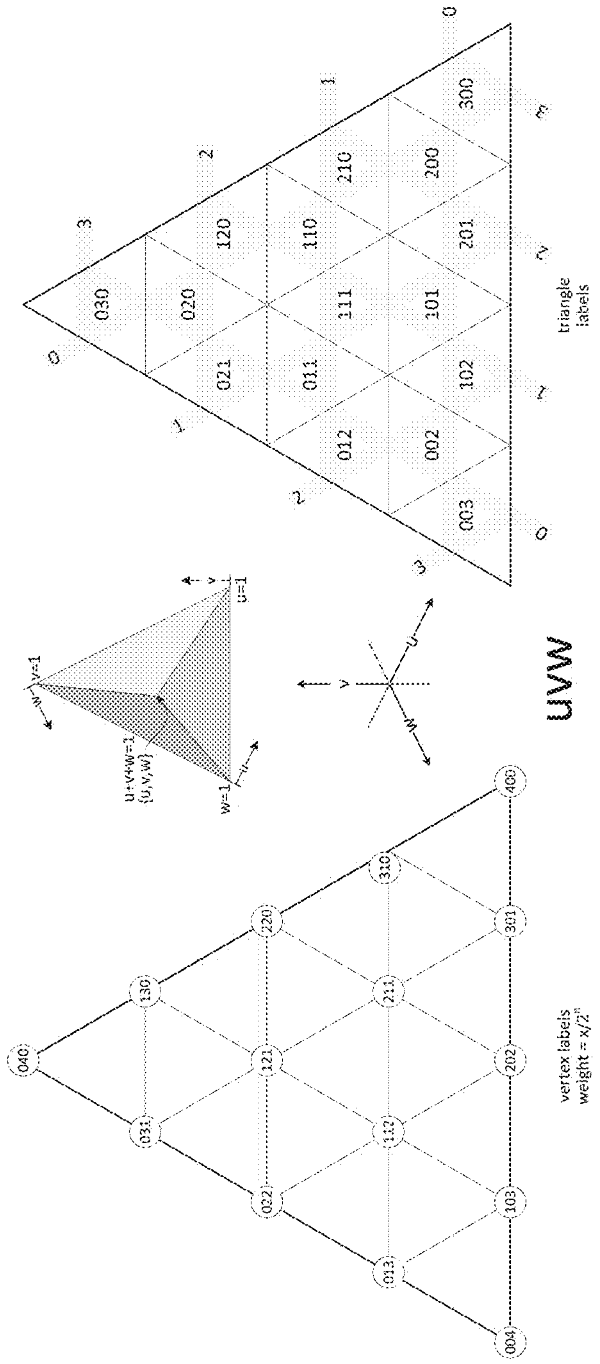
FIG. 27 illustrates barycentric coordinates and discrete barycentric coordinates, in accordance with some embodiments.

The term discrete barycentric coordinates is used to refer to and address the individual μ-triangles in a μ-mesh. Here the μ-triangles are named using a <u, v, w> three-tuple where the valid (integer) values vary with the resolution. In FIG. 27, a μ-mesh with four μ-triangles along each edge is shown, for a total of sixteen μ-triangles. Each μ-triangle has a name (label) where the members of the tuple <u, v, w> sum to two or three. Any pair of neighboring triangles will differ by 1 in one of the tuple members. Also note that the mesh is made up of rows of μ-triangles of constant u, v, or w. The μ-triangle labels are shown in the triangle μ-mesh on the right, and corresponding vertex labels are shown in the triangle μ-mesh on the left.

When encoding the μ-mesh, the μ-triangles of the μ-mesh are traversed. An illustration of the first four generations of the space filling curve used for traversing the μ-mesh according to some embodiments is shown in FIG. 28. Each of the four traversal patterns shows a traversal through a different level of resolution of the same triangle. FIG. 29 shows the pseudocode for a recursive function that visits the μ-triangles of the mesh in traversal order. While only the first four generations (levels) of the traversal curve are shown in FIG. 28, it will be understood that the recursive function can encode meshes at any level of a hierarchy of μ-meshes each level providing a different level of detail (or in other words, a different resolution). According to an embodiment, a hierarchy of μ-mesh grids may have the resolution increase by powers of four for each level of the hierarchy. For example, FIG. 28 shows a triangle area for which the number of triangular μ-meshes for respective levels are 4, 16, 64 and 128. Further details of μ-mesh traversal is provided in concurrently filed U.S. application Ser. No. 17/946,221 "Accelerating Triangle Visibility Tests for Real-Time Ray Tracing" already incorporated by reference.

Displacement Compression

In example embodiments, displacement amounts can be stored in a flat, uncompressed format where the UNORM11 displacement for any μ-vertex can be directly accessed.

Alternatively, displacement amounts can also be stored in a compression format that uses a predict-and-correct (P&C) mechanism.

Displacement Compression—Predict and Correct

The P&C mechanism in an example embodiment relies on the recursive subdivision used to form a μ-mesh. A set of three base anchor points (or displacement amounts) are specified for the base triangle. At each level of subdivision, new vertices are formed by averaging the two adjacent vertices in the lower level. This is the prediction step: predict that the value is the average of the two adjacent vertices.

The next step corrects that prediction by moving it up or down to get to where it should be. When those movements are small, or are allowed to be stored lossily, the number of bits used to correct the prediction can be smaller than the number of bits needed to directly encode it. The bit width of the correction factors is variable per level.

In more detail, for P&C, a set of base anchor displacements are specified for the base triangle. During each subdivision step to the next highest tessellation level, displacements amounts are predicted for each new μ-vertex by averaging the displacement amounts of the two adjacent (micro) vertices in the lower level. This prediction step predicts the displacement amount as the average of the two (previously received or previously calculated) adjacent displacement amounts.

The P&C technique is described here for predicting and correcting scalar displacements, but the P&C technique is not limited thereto. In some embodiments, μ-triangles may have other attributes or parameters that can be encoded and compressed using P&C. Such attributes or parameters could include for example color, luminance, vector displacement, visibility, texture information, other surface characterizations, etc. For example, a decoder can use attributes or parameters it has obtained or recovered for a triangle it has already decoded to predict the attributes or parameters of a further triangle(s). In one embodiment, the decoder may predict the attributes or parameters of sub-triangles based on the already-obtained or recovered attributes or parameters for a triangle the decoder subdivides to obtain such sub-triangles. The encoder can send the decoder a correction it has generated by itself calculating the prediction and comparing the prediction with an input value to obtain a delta that it then sends to the decoder as a correction. The decoder applies the received correction to the predicted attributes or parameters to reconstruct the attributes or parameters. In one embodiment, the correction can have fewer bits than the reconstructed attribute or parameter, reducing the number of bits the encoder needs to communicate to the decoder. In one embodiment, the correction can comprise a correction factor and a shift value, where the shift value is applied to the correction factor to increase the dynamic range of the correction factor. In one embodiment, the correction factors and shift values for different tessellation levels are selected carefully to ensure the functions are convex and thereby prevent cracks in the mesh. Moreover, the P&C technique can be used to encode such attributes or parameters for μ-meshes of various shapes other than triangles such as, for example, quadrilaterals such as squares, cuboids, rectangles, parallelograms, and rhombuses; pentagons, hexagons, other polygons, other volumes, etc.

In some embodiments in which the P&C technique is used to encode displacement amounts, the base anchor points are unsigned (UNORM11) while the corrections are signed (two's complement). A shift value allows for corrections to be stored at less than the full width. Shift values are stored per level with four variants (a different shift value for the μ-vertices of each of the three sub triangle edges, and a fourth shift value for interior μ-vertices) to allow vertices on each of the sub-triangle mesh edges to be shifted independently (e.g., using simple shift registers) from each other and from vertices internal to the sub-triangle. Each decoded value becomes a source of prediction for the next level down. Example pseudocode for this P&C technique is shown in FIG. 30. The pseudocode in FIG. 30 implements an calculation referred to in the description below as "Formula 1". The prediction line in the pseudocode in FIG. 30 has an extra "+1" term which allows for rounding, since the division here is the correction's truncating division. It is equivalent to prediction=round $(v_0+v_1)/2)$ in exact precision arithmetic, rounding half-integers up to the next whole number.

In more detail, at deeper and deeper tessellation levels, the μ-mesh surface tends to become more and more self-similar—permitting the encoder to use fewer and fewer bits to encode the signed correction between the actual surface and the predicted surface. The encoding scheme in one embodiment provides variable length coding for the signed correction. More encoding bits may be used for coarse corrections, fewer encoding bits are needed for finer corrections. Thus, in one embodiment, when corrections for a great many μ-triangles are being encoded, the number of correct bits per μ-triangle can be small (e.g., as small as a single bit in one embodiment).

Further details of the encoding and decoding of displacement amounts are described in U.S. application Ser. No. 17/946,563 titled "Displaced MicroMesh Compression", already incorporated by reference. It is noted that in an embodiment the decoded position wraps according to unsigned arithmetic rules when adding the correction to the prediction. It is up to the software encoder to either avoid wrapping based on stored values or to make that wrapping determined according to outcome. An algorithm by which the encoder can make use of this wrapping to improve quality is described below.

Displacement Compression—A Robust Constant-Time Algorithm for Finding the Closest Correction As described above, corrections from subdivision level n to subdivision level n+1 are signed integers with a fixed number of bits b (given by the sub-triangle format and subdivision level) and are applied according to the formula in FIG. 30. Although an encoder may compute corrections in any of several different ways, a common problem for an encoder is to find the b-bit value of c (correction) that minimizes the absolute difference between the d (decoded) and a reference (uncompressed) value r in the formula in FIG. 30, given p (prediction) and s (shift[level][type]).

This is complicated by how the integer arithmetic wraps around (it is equivalent to the group operation in the Abelian group $Z/2^{11}Z$), but the error metric is computed without wrapping around (it is not the Euclidean metric in $Z/2^{11}Z$). An example is provided to further show how this is a nontrivial problem.

Figure 31:
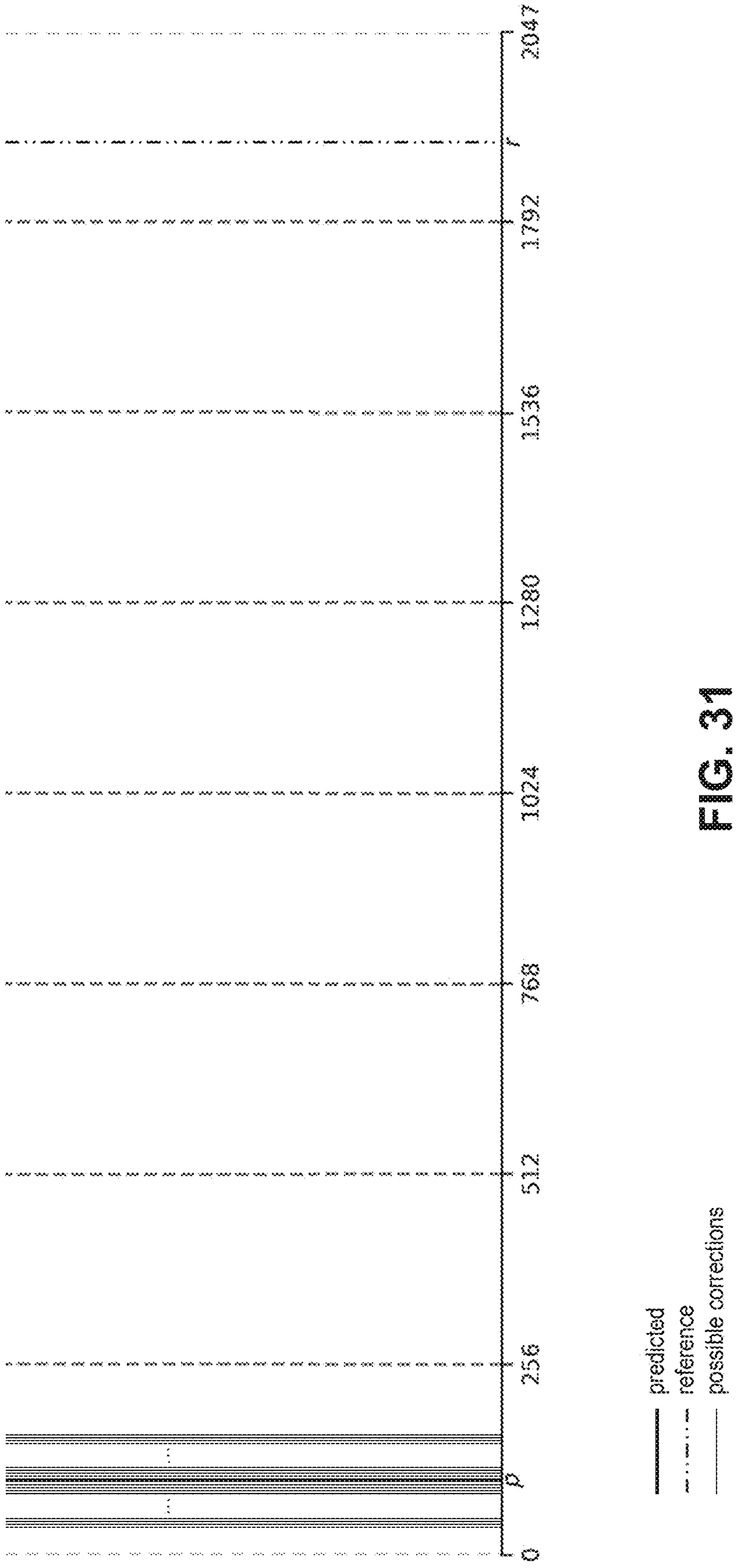
FIGS. 31-32 show the relationship between a prediction (p) and a reference value (r) in Formula 1, according to some embodiments.

Consider the case p=100, r=1900, s=0, and b=7, illustrated in FIG. 31. The highlighted vertical line p near the left-hand side of the graph shows the predicted displacement value, and the vertical line r shows the reference displacement value that the decoded value should come close to. Note that the two lines are close to opposite extremes of the 11-bit space shown. This can happen relatively often when using a prismoid maximum-minimum triangle convex hull to define the displacement values.

It is shown that the number line of all UNORM11 values from 0 to 2047, the locations of p in thick line and r in a dot-dash line, and in the lighter shade around the thick line of p, all possible values of d for all possible corrections (since b=7, the possible corrections are the signed integers from −2^6=−64 to 2^6−1=63 inclusive).

In this example, there is a shift of 0 and a possible correction range of −64 to +63 as shown by the vertical lines on the left and right side of the prediction line labelled p. The decoder should preferably pick a value that is closest to the r line within the standard Euclidean metric. This would appear to be the right-most vertical line at +63. However, when applying wraparound arithmetic, the closest line to the reference line r is not the right-most line, but rather is the left-most line at −64 since this leftmost line has the least distance from the reference line r using wraparound arithmetic.

In this case, the solution is to choose the correction of c=63, giving a decoded value of d=163 and an error of abs(r−d)=1737. If the distance metric was that of $Z/2^{11}Z$, the solution would instead be c=−64, giving a decoded value of d=36 and an error of 183 (wrapping around). So, even though using the error metric of $Z/2^{11}Z$ is easier to compute, it produces a correction with the opposite sign of the correct solution, which results in objectionable visual artifacts such as pockmarks.

Figure 32:
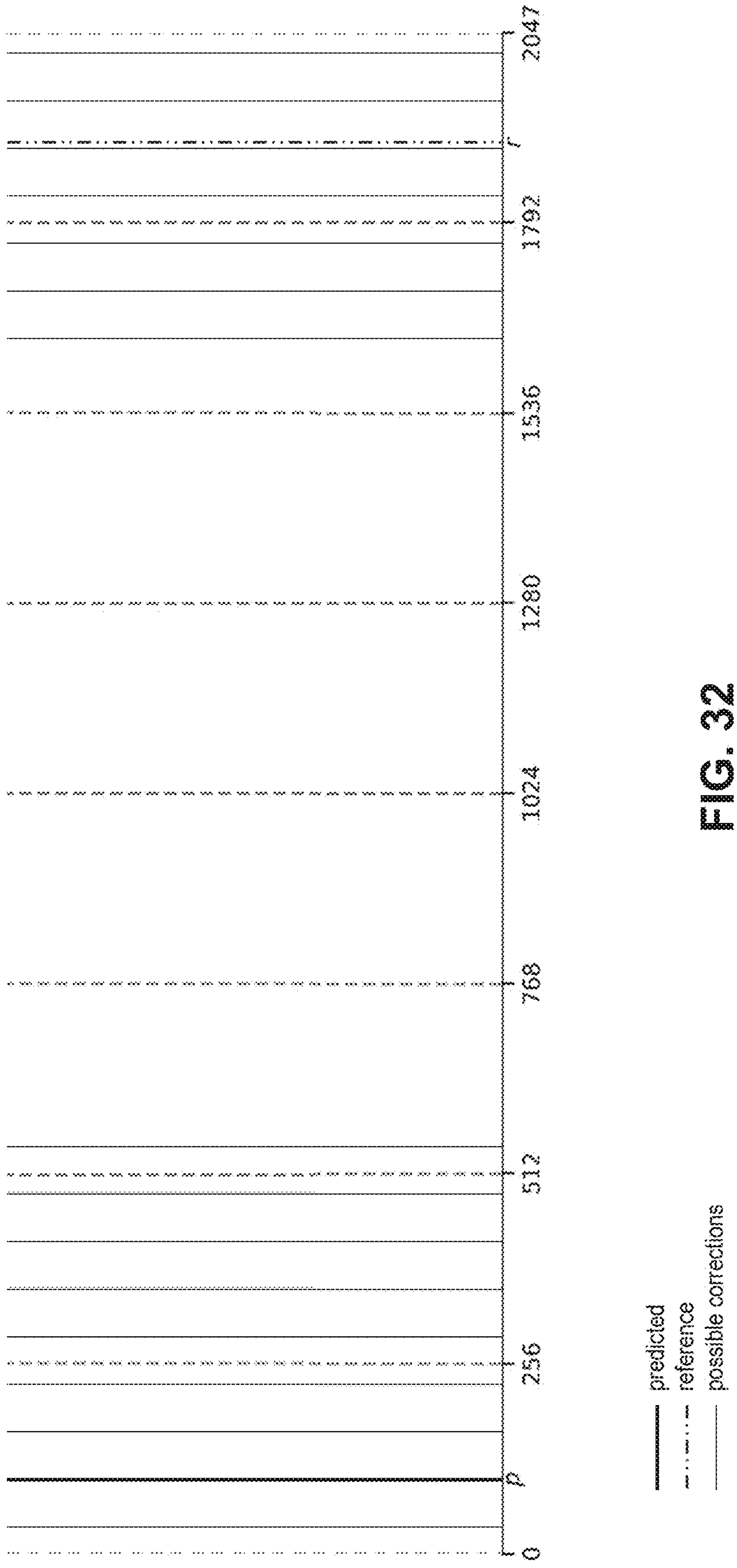

Next, consider the case p=100, r=1900, s=6, and b=3, illustrated in FIG. 32. Here, fewer bits and a nonzero shift are seen. The lines around p and r are 2^s=32 apart and wrap around the ends of the range. The shift is specified as 6 and there are only three bits of correction to work with, so the correction values are 64 apart. The possible corrections are the integers from −8 to 7 inclusive as indicated by the vertical lines.

In this case, the solution is to choose the correction of c=−4, giving a decoded value of d=1892 and an error of abs(r−d)=8. The wraparound behavior may be exploited to get a good result here, but by doing so, it is seen that a nonzero shift can give a lower error than the previous case, even with fewer bits.

Other scenarios are possible. The previous scenario involved arithmetic underflow; cases requiring arithmetic overflow are also possible, as well as cases where no overflow or underflow is involved, and cases where a correction obtains zero error.

FIG. 33 presents pseudocode for an algorithm that given unsigned integers 0≤p<2048, 0≤r<2048, an unsigned integer shift 0≤s<11, and an unsigned integer bit width 0≤b≤11, always returns the best possible integer value of c (between $-2^b$ and $2^b-1$ inclusive if b>0, or equal to 0 if b=0) within a finite number of operations (regardless of the number of b-bit possibilities for c). In the illustrated pseudocode for steps 1-8, non-mathematical italic text within parentheses represents comments, and modulo operations (mod) are taken to return positive values.

Basically, the pseudocode algorithm recognizes that the reference line r must always be between two correction value lines within the representable range or exactly coincident with a correction value line within the range. The algorithm flips between two different cases (the reference value between the two extreme corrections or the reference value is between two representable values), and chooses the case with the lower error. Basically, the wraparound case provides a "shortcut" for situations where the predicted and reference values are near opposite ends of the bit-limited displacement value range in one embodiment.

Displacement Storage

In some embodiments, displacement amounts are stored in 64B or 128B granular blocks called displacement blocks. The collection of displacement blocks for a single base triangle is referred to as a displacement block set. A displacement block encodes displacement amounts for either 8×8 (64), 16×16 (256), or 32×32 (1024) μ-triangles.

In some embodiments, the largest memory footprint displacement set will have uniform uncompressed displacement blocks covering 8×8 (64) μ-triangles in 64 bytes. The smallest memory footprint would come from uniformly compressed displacement blocks covering 32×32 in 64 bytes, which specifies ~0.5 bits per μ-triangle. There is roughly a factor of 16× difference between the two. The size of a displacement block in memory (64B or 128b) paired with the number of μ-triangles it can represent (64, 256 or 1024) defines a μ-mesh type. μ-mesh types can be ordered from most to least compressed, giving a "compression ratio order" used in watertight compression. Further details of the displacement storage are described in U.S. application Ser. No. 17/946,563 titled "Displaced MicroMesh Compression", already incorporated by reference.

Compressor

Real-time graphics applications often need to compress newly generated data on a per frame basis (e.g., the output of a physics simulation), before it can be rendered. To satisfy this requirement some embodiments employ a fast compression scheme that enables encoding sub-triangles in parallel, with minimal synchronization, while producing high quality results that are free of cracks.

One of the primary design goals for this compression algorithm is to constrain the correction bit widths so that the set of displacement values representable with a given μ-mesh type is a strict superset of all values representable with a more compressed μ-mesh type. By organizing the μ-mesh types from most to least compressed, the embodiments can proceed to directly encode sub-triangles in "compression ratio order" using the P&C scheme described above, starting with the most compressed μ-mesh type, until a desired level of quality is achieved. This scheme enables parallel encoding while maximizing compression, and without introducing mismatching displacement values along edges shared by sub-triangles.

First, constraints that need to be put in place to guarantee crack-free compression are described. Second, a simple encoding algorithm for a single sub-triangle using the prediction & correction scheme is presented. Third, a compression scheme for meshes that adopt a uniform tessellation rate (i.e., all base triangles contain the same number of μ-triangles) is introduced. Finally, it is shown how to extend this compressor to handle adaptively tessellated triangle meshes. Whereas some description of the compression algorithm is provided below, further details of the algorithm are described in U.S. application Ser. No. 17/946,563 titled "Displaced MicroMesh Compression", already incorporated by reference.

Compressor-Constraints for Crack-Free Compression

Figure 34B:
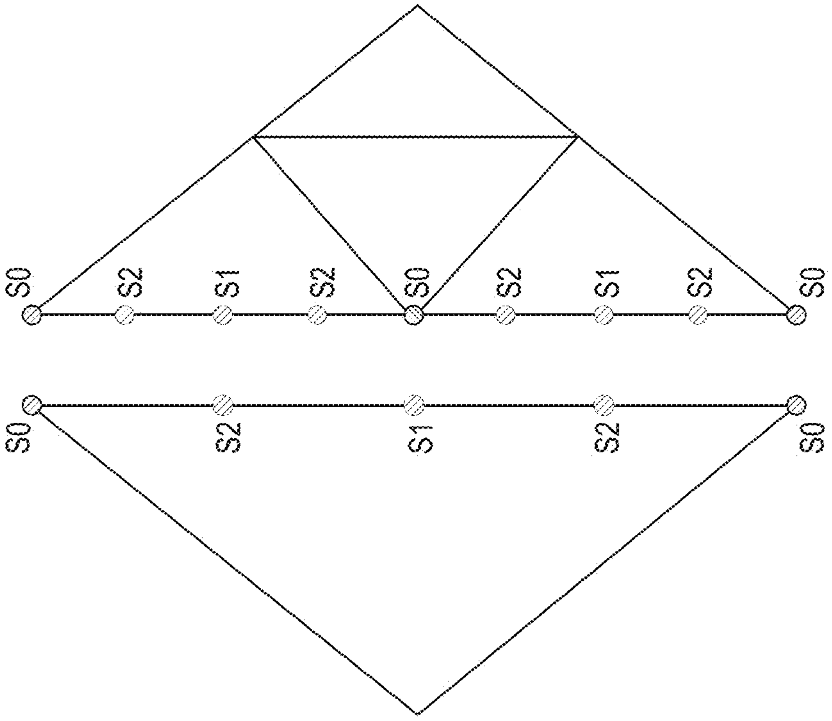
FIGS. 34A and 34B illustrate examples of an edge shared by sub-triangles encoded with different μ-mesh types, and an edge shared by sub-triangles with mismatching tessellation rates, but same μ-mesh type.
Figure 34A:
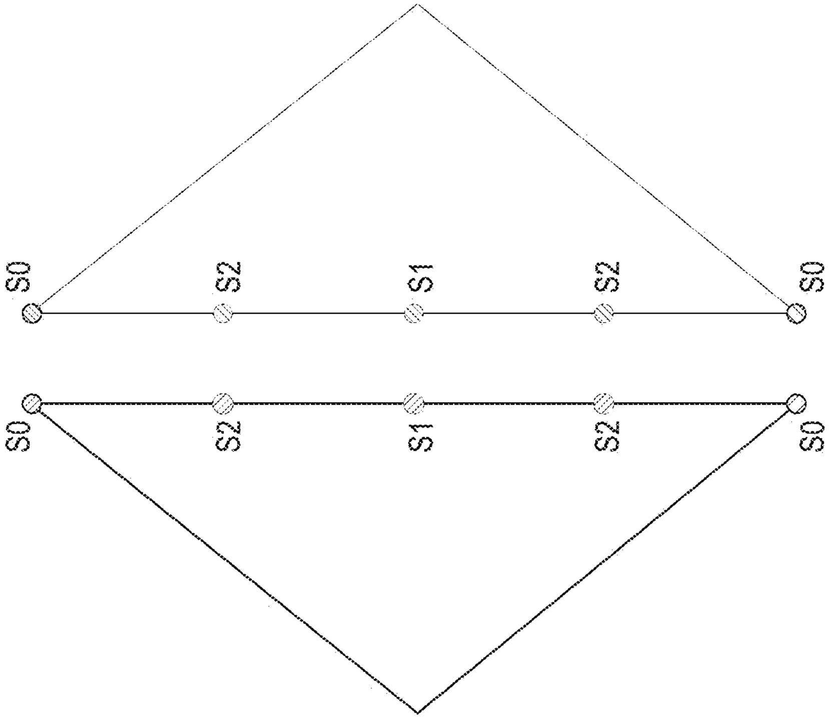

FIG. 34A illustrates the case of two sub-triangles sharing an edge. Both sub-triangles are tessellated at the same rate but are encoded with different μ-mesh types. In the Figure, the space between the two triangles is just for purposes of more clear illustration. In the example shown, the μ-vertices are assigned a designator such as "S1". Here, the letter "S" refers to "subdivision" and the number following refers to the number of the subdivision. Thus, one can see that "S0" vertices on the top and bottom of the shared edge for each sub triangle will be stored at subdivision level zero-namely in uncompressed format. A first subdivision will generate the "S1" vertex at subdivision level 1, and a second subdivision will generate the "S2" vertices at subdivision level 2.

To avoid cracks along the shared edge, the decoded displacement values of the two triangles must match. S0 vertices match since they are always encoded uncompressed. S1 and S2 vertices will match if and only if (1) the sub-triangle is encoded in "compression ratio order" and (2) displacement values encoded with a more compressed μ-mesh type are always representable by less compressed μ-mesh types. The second constraint implies that for a given subdivision level a less compressed μ-mesh type should never use fewer bits than a more compressed μ-mesh type. For instance, if the right sub-triangle uses a μ-mesh type more compact than the left sub-triangle, the right sub-triangle will be encoded first. Moreover, the post-encoding displacement values of the right sub-triangle's edge (i.e., its edge that is shared with the right sub-triangle) will be copied to replace the displacement values from the left sub-triangle. Property (2) ensures that once compressed, the displacement values along the left sub-triangle's edge is losslessly encoded, creating a perfect match along the shared edge.

FIG. 34B illustrates the case of an edge shared between triangles with different tessellation rates (2× difference) but encoded with the same μ-mesh type. To ensure decoded displacements match from both sides of the shared edge values encoded at a given level must also be representable at the next subdivision level (e.g., see S1-S2 and S0-S1 vertex pairs). In one embodiment, this can be accomplished if and only if (1) sub-triangles with lower tessellation rate are encoded before sub-triangles with higher tessellation rate and (2) for a given μ-mesh type the correction bit width for subdivision level N is the same or smaller than for level N−1. In other words, this latter property dictates that for a μ-mesh type the number of bits sorted by subdivision level should form a monotonically decreasing sequence. For instance, the left triangle in FIG. 34B will be encoded first, and its post-decoding displacement values will be copied to the vertices shared by the three triangles on the right-hand side, before proceeding with their encoding.

To summarize, when encoding a triangle mesh according to some embodiments, the following constraints on ordering are adopted to avoid cracks in the mesh:

- Sub-triangles are encoded in ascending tessellation-rate order; and
- Sub-triangles with the same tessellation rate are encoded in descending compression rate order, and the following constraints are imposed on corrections bit widths configurations in some embodiments:

- For a given μ-mesh type, a subdivision level never uses fewer bits than the next level; and
- For a given subdivision level, a μ-mesh type never uses fewer bits than a more compressed type.

The rule above accounts for μ-mesh types that represent the same number of μ-triangles (i.e. same number of subdivisions), but with different storage requirements (e.g. 1024μ-triangles in 128B or 64B). Note that the effective number of bits used to represent a displacement value is given by the sum of its correction and shift bits.

Compressor—Sub-Triangle Encoder

According to some embodiments, a 2-pass approach is used to encode a sub-triangle with a given μ-mesh type.

The first pass uses the P&C scheme described above to compute lossless corrections for a subdivision level, while keeping track of the overall range of values the corrections take. The optimal shift value that may be used for each edge and for the internal vertices (4 shift values total in one embodiment) to cover the entire range with the number of correction bits available is then determined. This process is performed independently for the vertices situated on the three sub-triangle edges and for the internal vertices of the sub-triangle, for a total of 4 shift values per subdivision level. The independence of this process for each edge is required to satisfy the constraints for crack-free compression.

The second pass encodes the sub-triangle using once again the P&C scheme, but this time with lossy corrections and shift values computed in the 1st pass. The second pass uses the first pass results (and in particular the maximum correction range and number of bits available for correction) to structure the lossy correction and shift values—the latter allowing the former to represent larger numbers than possible without shifting. The result of these two passes can be used as-is, or can provide the starting point for optimization algorithms that can further improve quality and/or compression ratio.

A hardware implementation of the P&C scheme (see FIG. 30) may exhibit wrapping around behavior in case of (integer) overflow or underflow. This property can be exploited in the 2nd pass to represent correction values by "wrapping around" that wouldn't otherwise be reachable given the limited number of bits available. This also means that the computation of shift values based on the range of corrections can exploit wrapping to obtain higher-quality results (see "Improving shift value computation by utilizing wrapping" below).

Note that this procedure can never fail per se, and for a given μ-mesh type, a sub-triangle can always be encoded. That said, the compressor can analyze the result of this compression step and by using a variety of metrics and/or heuristics decide that the resulting quality is not sufficient. (See "Using displacement direction lengths in the encoding success metric" below.) In this case the compressor can try to encode the sub-triangle with less compressed μ-mesh types, until the expected quality is met. This iterative process can lead to attempting to encode a sub-triangle with a μ-mesh type that cannot represent all its μ-triangles. In this case the sub-triangle recursively split in four sub-triangles until it can be encoded.

Compressor—Improving Shift Value Computation by Utilizing Wrapping

Minimizing the size of the shift at each level for each vertex type may improve compression quality. The distance between the representable corrections (see the possible decoded values shown in FIGS. 31 and 32) is proportional to 2 to the power of the shift for that level and vertex type. Reducing the shift by 1 doubles the density of representable values, but also halves the length of the span represented by the minimum and maximum corrections. Since algorithms to compute corrections can utilize wraparound behavior, considering wraparound behavior when computing the minimum shift required to cover all corrections for a level and vertex type can improve quality.

Figure 35:
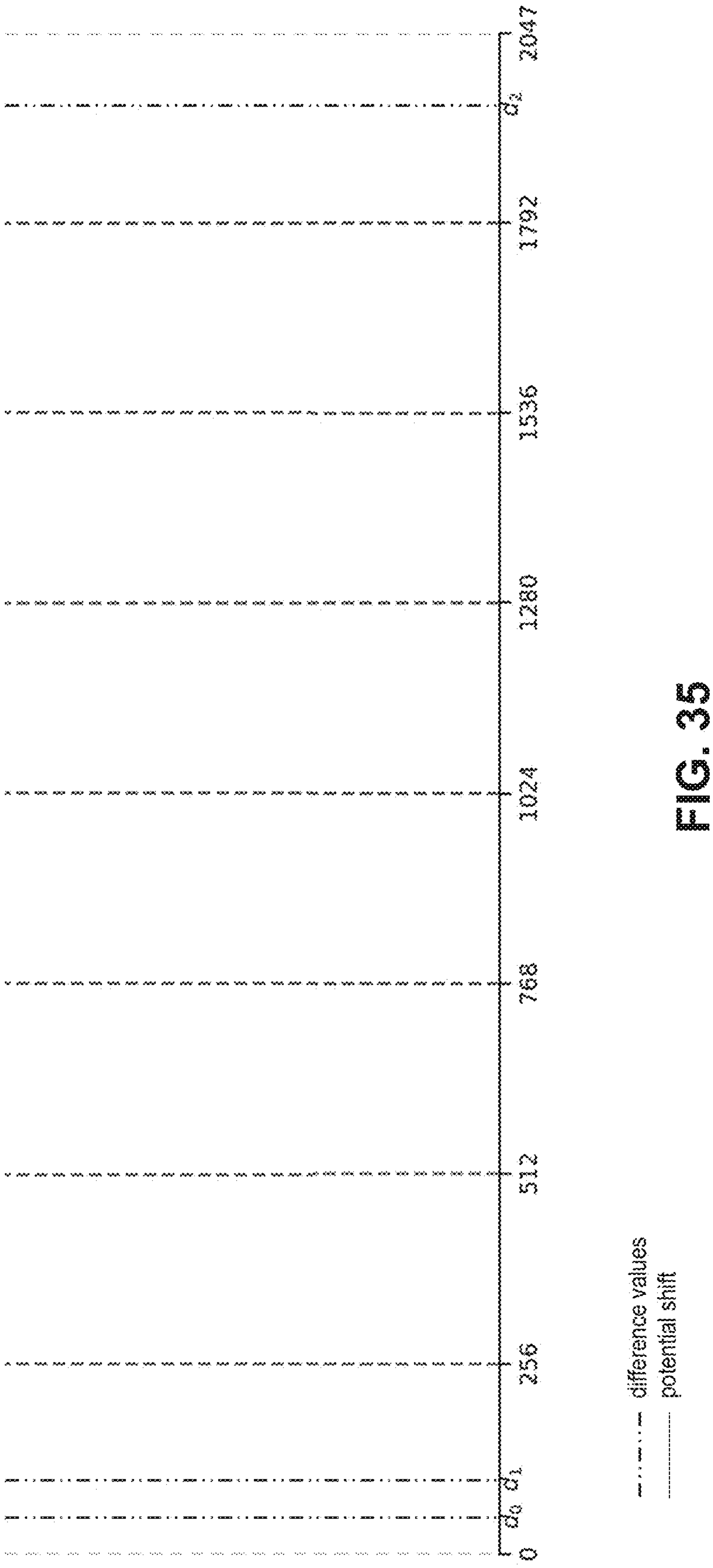
FIGS. 35-37 show examples of distribution of differences between reference and predicted values, according to some embodiments.
Figure 36:
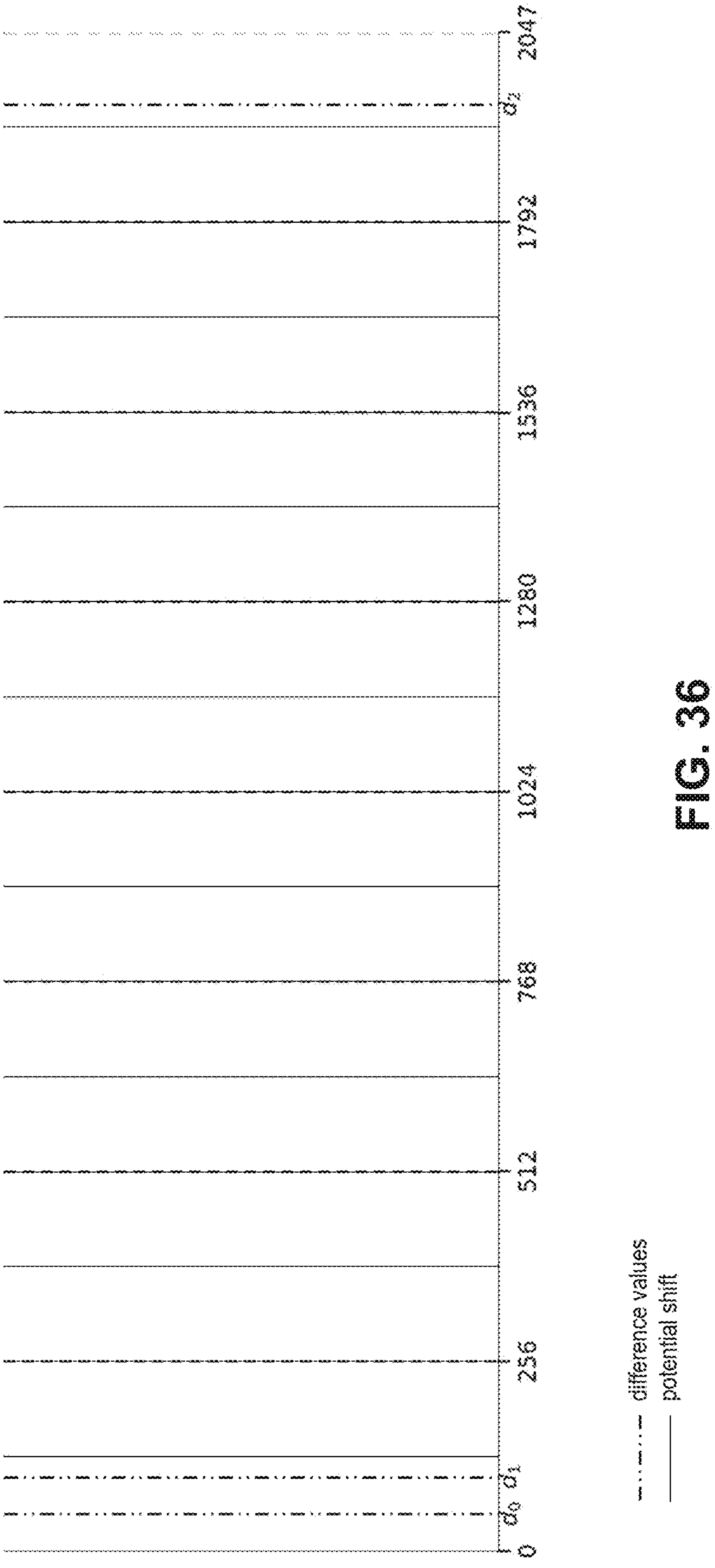
Figure 37:
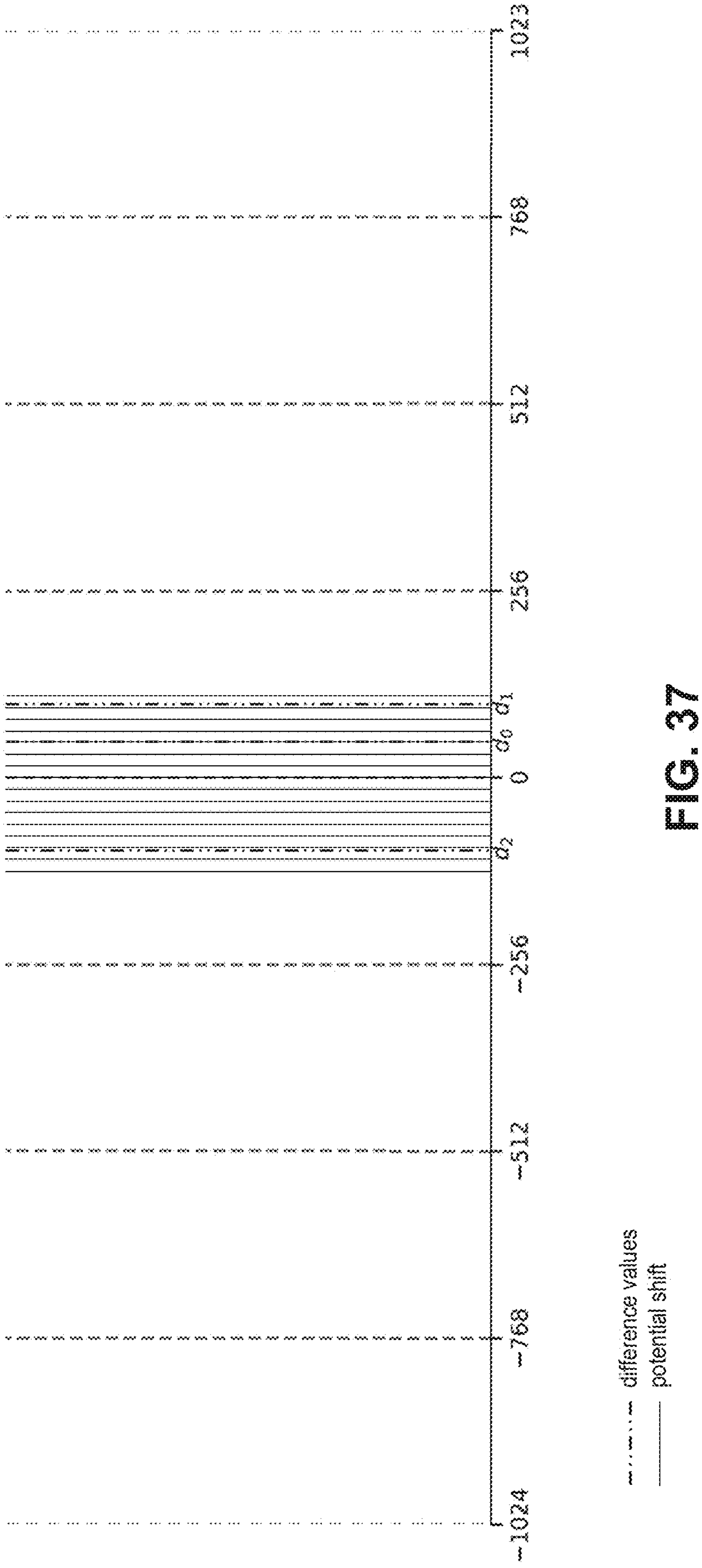

For instance, consider a correction level and vertex type where the differences mod 2048 $d_i$ between each reference and predicted value are distributed as in FIGS. 35-37. An algorithm that does not consider wrapping may conclude that it requires the maximum possible shift to span all such differences. However, since corrections may be negative and may wrap around, a smaller shift may produce higher quality results.

One possible algorithm may be as follows. Subtract 2048 from (differences mod 2048) that are greater than 1024, so that all wrapped differences $w_i$ lie within the range of integers −1024 . . . 1023 inclusive. This effectively places all the values within a subset of the original range—and transforms values that formerly were far apart so they are now close together. The resulting significantly smaller shifts come much closer to coinciding with the reference value. Then compute the shift s given the level bit width b as the minimum number s such that $$2^s(2^b - 1) \geq \max(w_i)$$

and $$-2^s(2^b) \leq \min(w_i).$$

Compressor—Using Displacement Ranges in the Encoding Success Metric

A method for interpreting scaling information as a per-vertex signal of importance, and a method for using per-vertex importance to modify the displacement encoder error metric are described. This improves quality where needed and reduces size where quality is not as important.

As described above, each vertex has a range over which it may be displaced, given by the displacement map specification. For instance, with the prismoid specification, the length of this range scales with the length of the interpolated direction vector and the interpolated scale. Meanwhile, the decoded input and output of the encoded format has fixed range and precision (UNORM11 values). This means that the minimum and maximum values may result in different absolute displacements in different areas of a mesh—and therefore, a UNORM11 error of a given size for one part of a mesh may result in more or less visual degradation compared to another.

In one embodiment, a per-mesh-vertex importance (e.g., a "saliency") is allowed to be provided to the encoder such as through the error metric. One option is for this to be the possible displacement range in object space of each vertex (e.g., distance x scale in the prismoid representation—which is a measure of differences and thus computed error in object space); however, this could also be the output of another process, or guided by a user. The mesh vertex importance is interpolated linearly to get an "importance" for each μ-mesh vertex. Then within the error metric, the compressed versus uncompressed error for each error metric element is weighted by an error metric "importance" derived from the element's μ-mesh vertices' level of "importance". These are then accumulated and the resulted accumulated error—which is now weighted based on "importance" level—is compared against the error condition(s). In this way, the compressor frequently chooses more compressed formats for regions of the mesh with lower "importance", and less compressed formats for regions of the mesh with higher "importance".

Compressor—Mesh Encoder (Uniform)

The pseudo-code below illustrates how encoding of a uniformly tessellated mesh operates according to some embodiments:

```
foreach micromesh type (from most to least compressed):
    foreach not encoded sub-triangle:
        encode sub-triangle
        if successful then mark sub-triangle as encoded
            foreach partially encoded edge
                update reference displacements in not-yet-encoded sub-triangles.
```

Note that each sub-triangle carries a set of reference displacement values, which are the target values for compression. An edge shared by an encoded sub-triangle and one or more not-yet-encoded sub-triangles is deemed as "partially encoded". To ensure crack-free compression its decompressed displacement values are propagated to the not-yet-encoded sub-triangles, where they replace their reference values.

Compressor—Mesh Encoder (Adaptive)

As shown below encoding of adaptively tessellated meshes requires an additional outer loop, in order to process sub-triangle in ascending tessellation rate order:

```
foreach base triangle resolution (from lower to higher res):
    foreach micromesh type (from most to least compressed):
        foreach not encoded triangle:
            encode sub-triangle
            if successful then mark sub-triangle as encoded
        foreach partially encoded edge:
            update reference displacements in not-yet-encoded sub-triangles.
```

The outer loop is included because there is no assumption under these dynamic conditions of a "manifold" or "well formed" mesh where edges are shared only between two triangles. Other techniques can replace the outer loop but may result in worse quality.

Note that when updating the reference displacements for edges shared with sub-triangles that use a 2× higher tessellation rate, only every other vertex is affected (see FIG. 34B), while the remaining vertices are forced to use zero corrections in order to match the displacement slope on the shared edge of the lower resolution sub-triangle. Moreover, higher resolution sub-triangles that "receive" updated displacement values from lower resolution sub-triangles are not guaranteed to be able to represent such values. While these cases tend to be rare, to avoid cracks, the updated reference values may be forced to be encoded losslessly, in order to always match their counterpart on the edge of the lower resolution sub-triangle. If such lossless encoding is not possible the sub-triangle fails to encode and a future attempt is made with a less compressed μ-mesh type.

Example Processes and System for Generating and Using μ-Meshes

Figure 38:
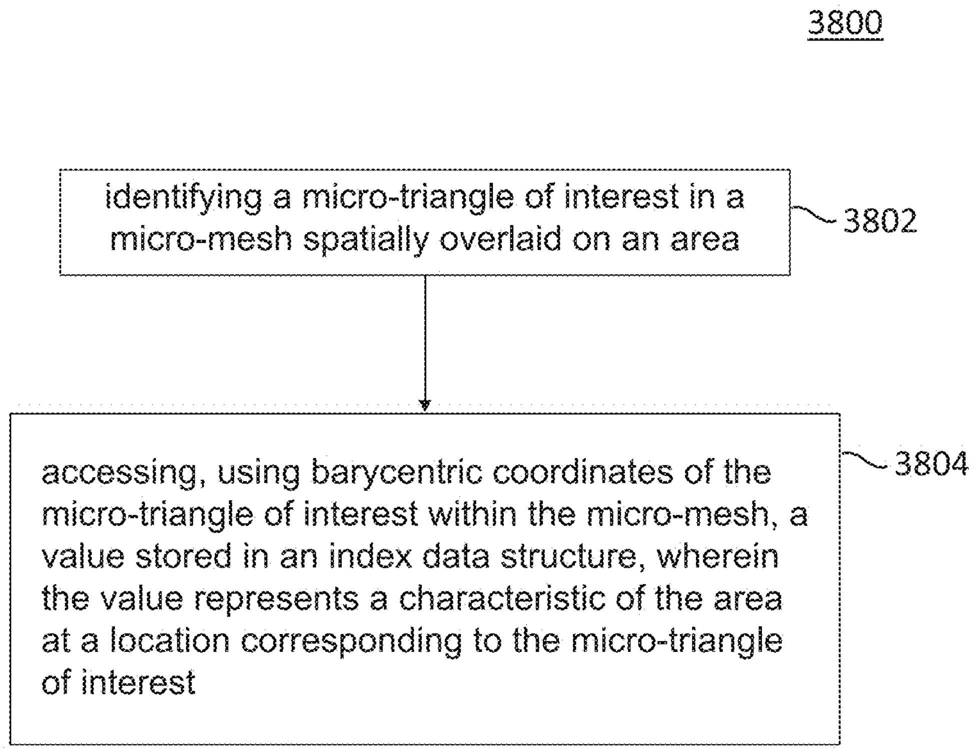
FIG. 38 shows a flowchart for a process for accessing a visibility mask or displacement map according to some example embodiments.

FIG. 38 is a flowchart for a process 3800 for using VMs and DMs described above during a rendering of an image, according to some example embodiment.

In an example embodiment, one or more objects in a scene may have associated VMs and/or DMs. As described above, the surface of an object in the scene is overlaid with one or more μ-meshes as described above (see, e.g., FIG. 7A), and, for each μ-mesh, visibility information is stored in a VM and displacement information is stored in a DM, that are then stored for subsequent use by a process such as process 3900 during rendering of the scene.

At operation 3802, a μ-triangle of interest in a μ-mesh that is spatially overlaid on an geometric primitive is identified. For example, in a ray tracing application, in response to the system detecting a hit on a ray-triangle intersection test, the μ-triangle in which the hit occurred is identified. In another example application, the identifying the μ-triangle may occur when a texel is selected during rasterization.

At operation 3804, a VM and/or a DM is accessed to obtain scene information for the hit location. The VM and/or DM is accessed using the barycentric coordinates of the identified μ-triangle of interest. The manner of storage of the VMs and DMs and the manner of accessing the VMs and DMs in example embodiments, in contrast to conventional texture mapping etc., does not require the storage or processing of additional coordinates and the like. The VM and DM may be separate index data structures that are each accessible using barycentric coordinates of a point (or µ-triangle) of interest within a µ-mesh.

As described above, the content and manner of storage for VMs and DMs are different, but they both are efficiently accessed using the barycentric coordinates of a µ-triangle in a µ-mesh overlaid on the geometric primitive, or more particularly, on a surface area of the geometric primitive.

In some embodiments, the VM and/or DM may be accessed based further on a desired level of detail. In some embodiments, the VM may be accessed based further on a characteristic other than visibility, for example, a characteristic such as a type of material enables visibility to be defined separately for different types of materials/surface types of the geometric primitive associated with the µ-mesh.

The values accessed in the VM and/or DM index data structures may be in encoded and/or compressed form, and may require to be unencoded and/or uncompressed before use. The accessed values can be used for rendering the object's surface area corresponding to the accessed point of interest.

Figure 39:
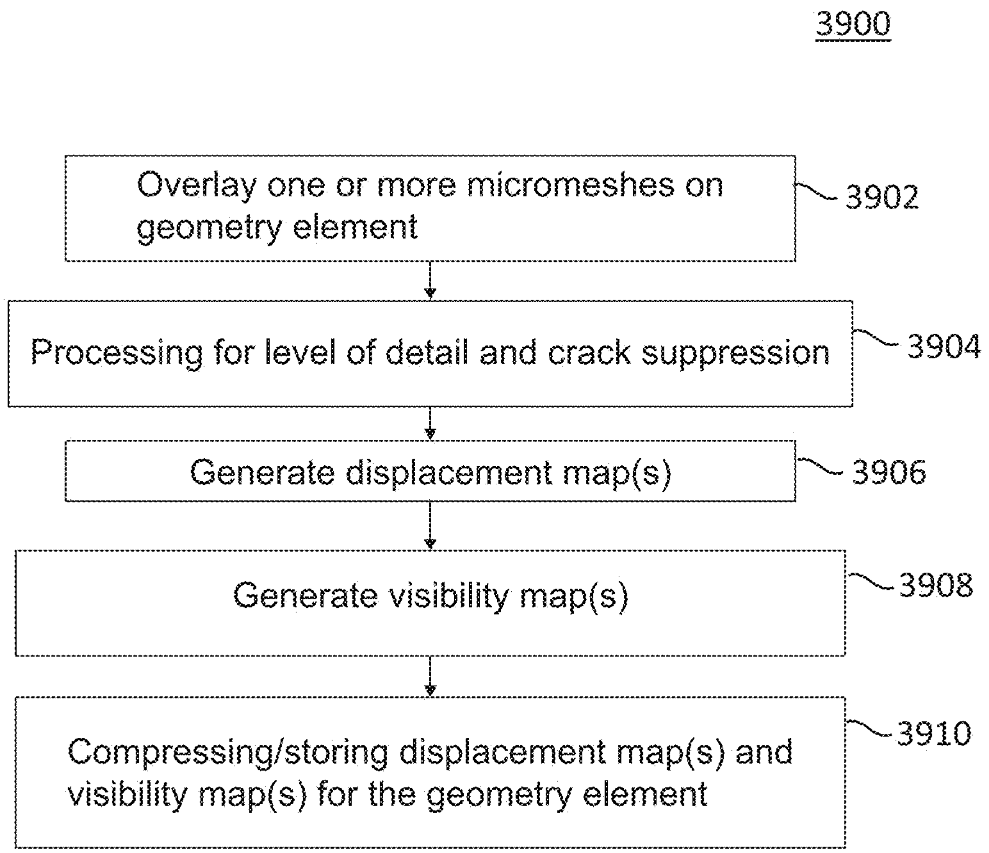
FIG. 39 shows a flowchart for a process for generating a visibility mask or displacement map according to some example embodiments.

FIG. 39 is a flowchart for a process 3900 for creating VMs and DMs described above, according to some example embodiment. The creation of the VMs and DMs for objects in a scene occurs before the rendering of that scene. In some embodiments, the process 3900 may be performed in association with the building of an acceleration data structure (e.g., BVH) for the scene.

At operation 3902, one or more µ-meshes are overlaid on the surface of a geometry element in a scene. The surface may be planar or warped. As an example, FIG. 7A shows an object with multiple overlaid µ-meshes. In an embodiment, the µ-meshes are grids of µ-triangles.

At operation 3904, the one or more µ-meshes are processed for crack suppression and/or level of detail (LOD). One or more of the techniques described above for crack suppression may be used in processing the one or more µ-meshes for crack suppression. For example, the described edge decimation techniques or the line equation adjustments described above can be used in example embodiments.

Moreover, based on the requirements of the application, characteristics of the scene, and/or the capabilities of the computer graphics system being used, a desired level of detail is determined and accordingly a number of levels to which the geometry surface is subdivided to obtain the desired resolution is determined.

At operation 3906, a displacement map is generated for the geometry element. The displacement map, as described above, provides a displacement amount and a displacement direction for respective vertices. The type of representation (e.g., base and displacement, prismoid specification, combination), scale and bias parameters for each mesh, and whether displacement vectors are normalized, etc. for the DM may be selected in accordance with a configuration parameter. One or more of the above described techniques for DM generation can be used in operation 3906. In one example embodiment, displacement amounts can be stored in a flat, uncompressed format where the displacement for any µ-vertex can be directly accessed. In another embodiment, the displacement map may be generated and encoded using the above described predict and control (P&C) technique and the constant-time algorithm for finding the closest correction. In an embodiment, as described above, the P&C technique and the algorithm for finding the closest correction is used in association with the fast compression scheme directed to constrain correction bit widths in displacement encodings. Embodiments may select either the uniform mesh encoder or the adaptive mesh encoder described above.

At operation 3908, a visibility mask is generated for the geometry element. Techniques to generate visibility masks were described above. The visibility mask may be generated in accordance with certain preset configuration values such as, for example, any of the set of visibility states to be identified, the number of bits to be used for encoding the visibility state, etc. After mapping an image to the µ-mesh, the visibility mask may be encoded in accordance with one of the techniques described above for visibility masks. In one example embodiment, the visibility mask can be encoded and compressed according to the run-length coding to a budget technique described above in combination with the barycentric coordinate to sequence mapping described above.

At operation 3910, the compressed displacement maps and visibility masks are stored for subsequent access. The visibility masks and displacement maps for a particular scene may be stored in association with the BVHs generated for that scene, so that they can be loaded for the computer graphic system's memory for efficient access in association with accesses to the corresponding geometry. The visibility masks and the displacement maps can be stored as separate index data structures or can be stored in the same index data structure, and the index data structure may be configured to be accessible using only the barycentric coordinates of a µ-triangle of interest. In some embodiments, the visibility masks and the displacement maps may be stored in a non-transitory computer readable storage medium to be used in another computer graphics system, while in some embodiments the maps are stored in a non-transitory storage medium so that it can be loaded into the memory of the computer graphics systems in real-time when rendering images.

Figure 40:
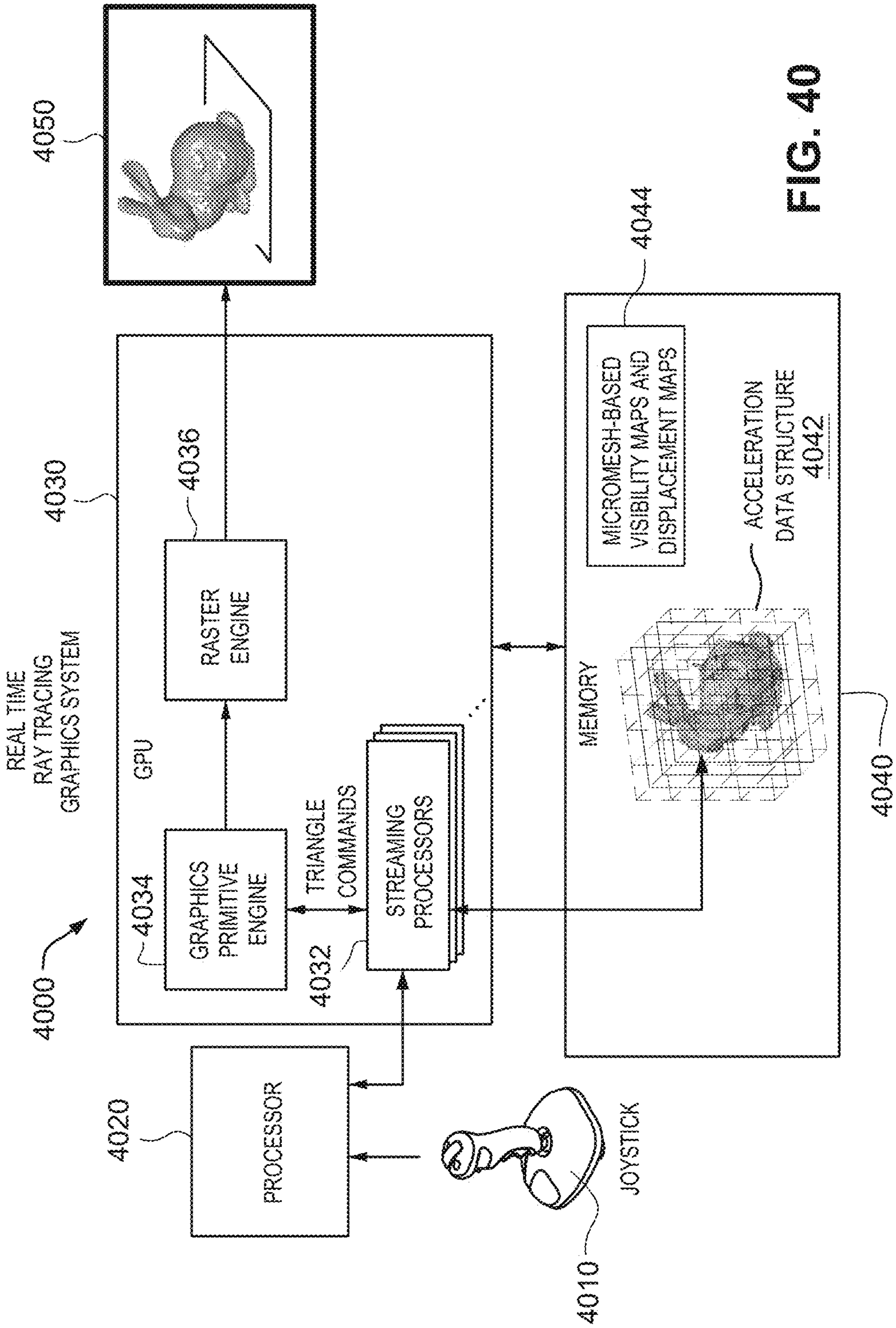
FIG. 40 shows an example computer system that is configured to create and/or use the micromesh-based visibility masks, displacement maps, etc., according to one or more embodiments.

FIG. 40 illustrates an example real time ray interactive tracing graphics system 4000 for generating images using three dimensional (3D) data of a scene or object(s) including an acceleration data structure such as a BVH and µ-mesh-based VMs and DMs as described above.

System 4000 includes an input device 4010, a processor(s) 4020, a graphics processing unit(s) (GPU(s)) 4030, memory 4040, and a display(s) 4050. The system shown in FIG. 40 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 4020 may be a multicore central processing unit (CPU) operable to execute an application in real time interactive response to input device 4010, the output of which includes images for display on display 4050. Display 4050 may be any kind of display such as a stationary display, a head mounted display such as display glasses or goggles, other types of wearable displays, a handheld display, a vehicle mounted display, etc. For example, the processor 4020 may execute an application based on inputs received from the input device 4010 (e.g., a joystick, an inertial sensor, an ambient light sensor, etc.) and instruct the GPU 4030 to generate images showing application progress for display on the display 4050.

Based on execution of the application on processor 4020, the processor may issue instructions for the GPU 4030 to generate images using 3D data stored in memory 4040. The GPU 4030 includes specialized hardware for accelerating the generation of images in real time. For example, the GPU 4030 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 4020, which may have multiple cores with lots of cache memory that can handle a few software threads at a time, the GPU 4030 may include hundreds or thousands of processing cores or "streaming multiprocessors" (SMs) 4032 running in parallel.

In one example embodiment, the GPU 4030 includes a plurality of programmable high performance processors that can be referred to as "streaming multiprocessors" ("SMs") 4032, and a hardware-based graphics pipeline including a graphics primitive engine 4034 and a raster engine 4036. These components of the GPU 4030 are configured to perform real-time image rendering using a technique called "scan conversion rasterization" to display three-dimensional scenes on a two-dimensional display 4050. In rasterization, geometric building blocks (e.g., points, lines, triangles, quads, meshes, etc.) of a 3D scene are mapped to pixels of the display (often via a frame buffer memory).

The GPU 4030 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 4050 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 4050.

SMs 4032 or other components (not shown) in association with the SMs may cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 4032 allows for computer-generated images to capture shadows, reflections, and refractions in ways that can be indistinguishable from photographs or video of the real world.

Given an acceleration data structure 4042 (e.g., BVH) comprising the geometry of a scene, the GPU, SM or other component, performs a tree search where each node in the tree visited by the ray has a bounding volume for each descendent branch or leaf, and the ray only visits the descendent branches or leaves whose corresponding bound volume it intersects. In this way, only a small number of primitives are explicitly tested for intersection, namely those that reside in leaf nodes intersected by the ray. In example embodiments, one or more µ-mesh based VMs and/or DMs 4044 are also stored in the memory 4040 in association at least some of the geometry defined in the BVH 4042. As described above, the µ-mesh-based VMs and DMs are used to enable the rendering of highly detailed information in association with the geometry of a scene in an efficient manner. According to some embodiments, the processor 4020 and/or GPU 4030 may execute process 3800 to, responsive to a ray hit on a geometry element of the BVH, efficiently lookup the associated VM(s) and/or DM(s) enabling rendering of the scene with improved efficiency and accuracy According to some embodiments, the one or more µ-mesh based VMs and/or DMs 4044 may be generated by the processor 4020 before they are available for use in rendering. For example, the one or more µ-mesh based VMs and/or DMs 4044 may be generated in accordance with a process 3900 executed by the processor 4020. The instructions for processes 3800, 3900 and other processes associated with the generation and/or use of the µ-mesh-based VMs and DMs, and/or the µ-mesh-based VMs and DMs may be stored in one or more non-transitory memory connected to the processor 4020 and/or the GPU 4030.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A non-transitory computer readable storage medium storing instructions that, when executed by a processor of a computer system comprising a memory, causes the computer system to perform operations comprising:

identifying a microtriangle of interest in a grid of microtriangles overlaid on an area on a surface of an object;

determining an index into an index data structure based only on barycentric coordinates of the microtriangle of interest within the grid of microtriangles without storing a mapping from the barycentric coordinates of the microtriangle of interest to an index into the index data structure;

accessing by indexing, in the memory and based only on the determined index, a value stored in the index data structure, wherein the value represents a characteristic of the surface at a location corresponding to a position of the microtriangle of interest; and rendering, in accordance with the accessed value, a pixel corresponding to the location corresponding to the position of the microtriangle of interest.

2. The non-transitory computer readable storage medium according to claim 1, wherein the index data structure stores at least a visibility status for each microtriangle in the grid of microtriangles, wherein the visibility status indicates at least one of an opaque visibility status and a transparent visibility status.

3. The non-transitory computer readable storage medium according to claim 1, wherein the index data structure stores at least a displacement for each microtriangle in the grid of microtriangles.

4. The non-transitory computer readable storage medium according to claim 3, wherein the displacement comprises a displacement direction and a displacement value.

5. The non-transitory computer readable storage medium according to claim 1, wherein the area comprises one or more triangle-shaped areas, the index data structure comprises a set of bits for each microtriangle, wherein the sets of bits for respective microtriangles of the grid of microtriangles are arranged in order of a preconfigured traversal path of the grid and of microtriangles.

6. The non-transitory computer readable storage medium according to claim 5, wherein the preconfigured traversal path corresponds to a space-filling curve for the area.

7. The non-transitory computer readable storage medium according to claim 1, wherein identifying a microtriangle of interest in a grid of microtriangles spatially overlaid on an area comprises:

determining a desired level of detail; and obtaining access to the grid of microtriangles, wherein the grid of microtriangles is identified as a grid corresponding to the desired level of detail in a hierarchy of respective grids each having a different level of detail and having triangles of a different size arranged to overlay the area.

8. The non-transitory computer readable storage medium according to claim 1, wherein the instructions, when executed by the processor, causes the computer system to perform operations further comprising:

accessing, in the memory and based only on barycentric coordinates of the microtriangle of interest within the grid of microtriangles, a second value stored in a second index data structure, wherein the first value is a visibility status and the second value is a displacement status; and rendering, in accordance with the visibility status and the displacement status, the pixel corresponding to the location corresponding to the position of the microtriangle of interest.

9. A data structure comprising a plurality of sets of bits, each set of bits corresponding to a respective group of one or more microtriangles in a plurality of microtriangles contiguously arranged to spatially overlay an area on a surface of an object, the plurality of sets of bits arranged in accordance with a preconfigured traversal order of the plurality of microtriangles, and each set of bits configured to represent a characteristic of the area at a location corresponding to a position of the microtriangle of interest, wherein the data structure is configured such that a location in the data structure is determined based only on barycentric coordinates of the microtriangle of interest without storing a mapping from the barycentric coordinates of the microtriangle of interest to an index into the data structure.

10. The data structure according to claim 9, configured to be accessed using barycentric coordinates associated with a microtriangle in the plurality of microtriangles.

11. The data structure according to claim 9, wherein bits in the plurality of sets of bits represent visibility information of the area on the surface, wherein the visibility information includes at least one of an opaque status and a transparent status for each texel of the area.

12. The data structure according to claim 9, wherein bits in the plurality of sets of bits represent displacement information of the area on the surface, wherein the displacement information includes a displacement value and a displacement direction for each texel of the area.

13. A method of forming an index data structure configured to provide access to values representing one or more characteristics of a surface of an object at a location corresponding to a position of a microtriangle of interest, the method comprising:

assigning a visibility status to each microtriangle in a grid of microtriangles spatially overlaid on an area on the surface, wherein the visibility status includes at least one of an opaque status and a transparent status;

encoding the index data structure based on barycentric coordinates of said each microtriangle and a preconfigured traversal order of the grid of microtriangles, wherein each location in the index data structure is configured to be accessed by determining the location in the index data structure based only on barycentric coordinates of a respective microtriangle of the grid of microtriangles without storing a mapping from the barycentric coordinates of the respective microtriangle to an index into the index data structure; and storing the encoded index data structure in a memory.

14. The method according to claim 13, wherein the storing the encoded index data structure in a memory includes associating the encoded index data structure with the object stored in a bounding volume hierarchy stored in the memory.

15. A method of forming an index data structure configured to provide access to values representing one or more characteristics of a surface of an object at a location corresponding to a position of a microtriangle of interest, the method comprising:

determining a displacement amount and a displacement direction for each microvertex of each microtriangle in a grid of microtriangles spatially overlaid on an area on the surface, wherein the displacement amount is specified in relation to a base triangle;

encoding the index data structure based on barycentric coordinates of said each microtriangle and a preconfigured traversal order of the grid of microtriangles, wherein each location in the index data structure is configured to be accessed by determining the location in the index data structure based only on barycentric coordinates of a respective microtriangle of the grid of microtriangles without storing a mapping from the barycentric coordinates of the respective microtriangle to an index into the index data structure; and storing the encoded index data structure in a memory.

16. The method according to claim 15, wherein the determining a displacement amount and a displacement direction for each microvertex of each microtriangle includes determining microtriangle vertices by prediction based on adjacent vertices, and the encoding includes encoding a correction of the prediction for respective predicted microvertices.

17. The method according to claim 15, wherein the determining a displacement amount and a displacement direction for each microvertex of each microtriangle further includes performing edge decimation in one or more micromeshes.

18. A method of forming a data structure representing geometry, comprising performing with at least one processor, operations comprising:

defining regions of a planar or warped geometric primitive;

assigning different visibility indicators to different regions;

encoding the visibility indicators based on a predetermined sequence of the regions; and storing the data structure including the encoded visibility indicators in a memory, wherein the encoded visibility indicator of each region is configured to be accessed by determining a location in the data structure based only on barycentric coordinates of the each region without storing a mapping from the barycentric coordinates of the each region to an index into the data structure.

* * * * *